INVENTORS
Robert C. Treseder
Albert P. Dinamore
Richard E. Moore
Howard M. Geyer
Kenneth L. Berninger
by Willis Hardman & Faber
their attorneys INVENTORS
Robert C. Treseder, Albert P. Dinsmore
Richard E. Moore, Howard M. Geyer
Kenneth L. Berninger
by Willity, Hardman & Fehr
their ATTORNEYS Jan. 11, 1955

R. C. TRESEDER ET AL 2,699,304

CONTROL FOR A PLURALITY OF VARIABLE
PITCH COUNTERROTATING PROPELLERS

Filed Dec. 26, 1950

INVENTORS
Robert C. Treseder
Albert P. Dinsmore
Richard E. Moore
Howard M. Geyer
Kenneth L. Berninger
by Willits Hardman & Fisher
their attorneys Jan. 11, 1955

R. C. TRESEDER ET AL 2,699,304

CONTROL FOR A PLURALITY OF VARIABLE
PITCH COUNTERROTATING PROPELLERS

Filed Dec. 26, 1950

INVENTORS
Robert C. Treseder, Albert P. Dinsmore,
Richard E. Moore, Howard M. Geyer
Kenneth L. Berninger
by Willkie, Hardman & Fehr
their attorneys

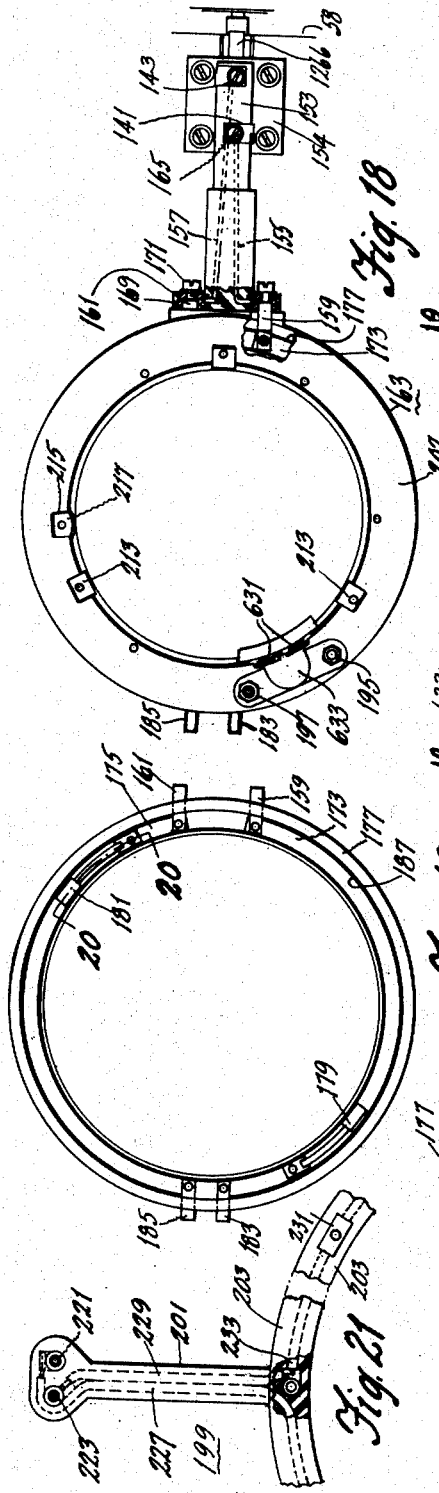
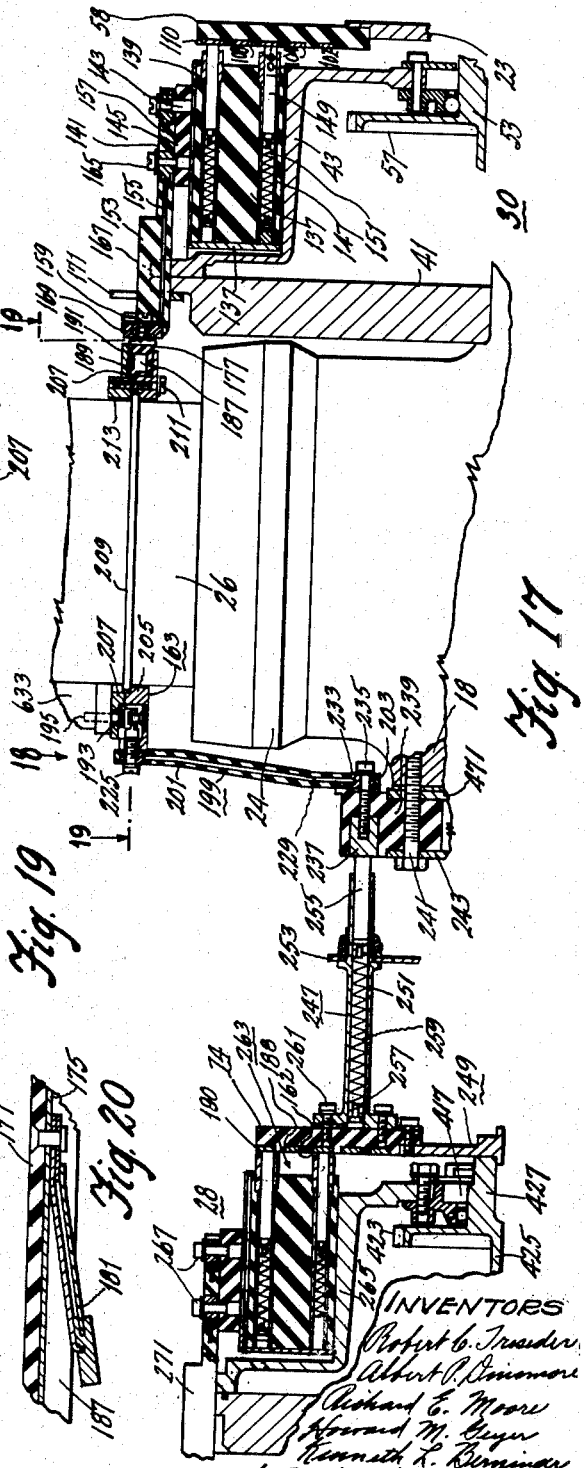

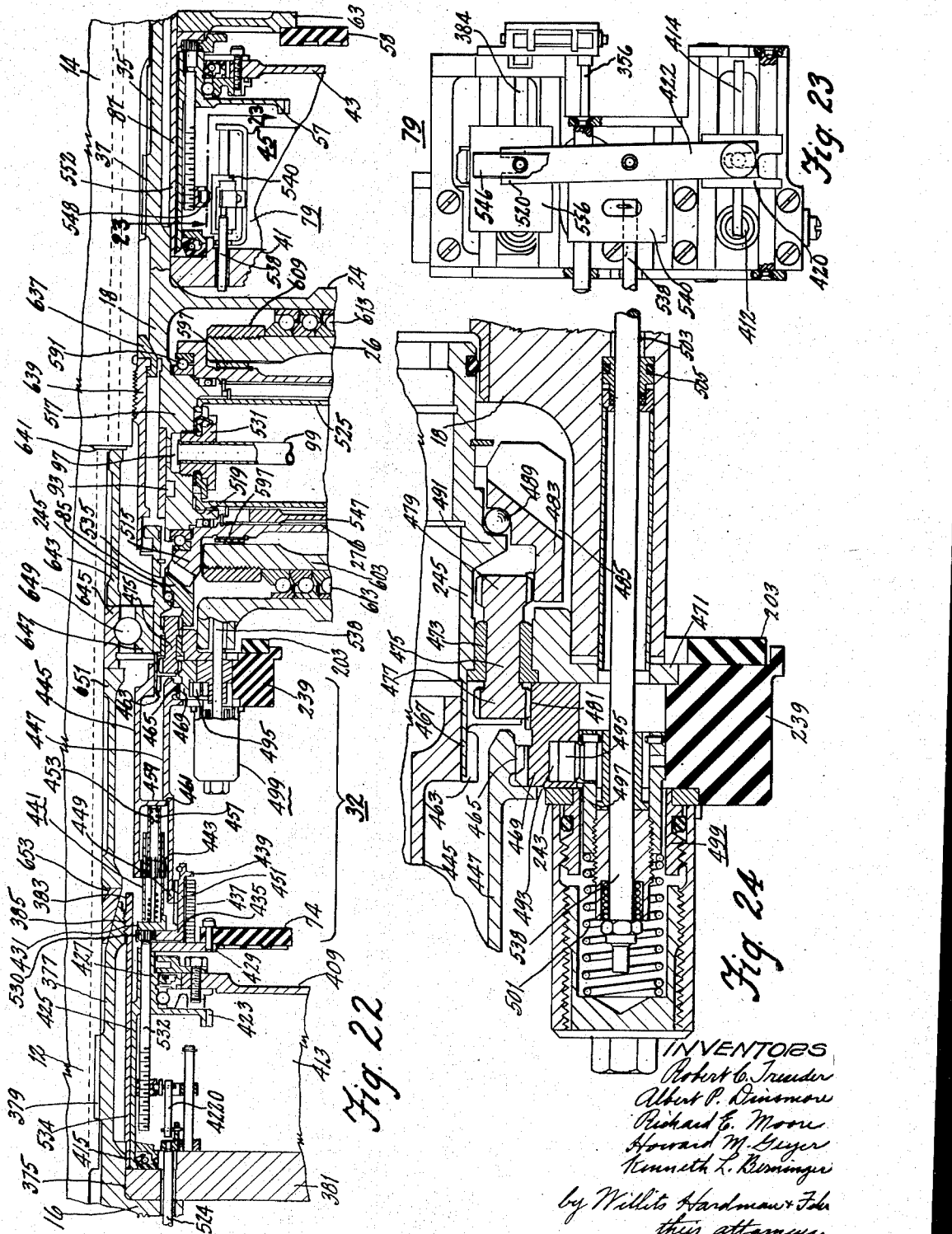

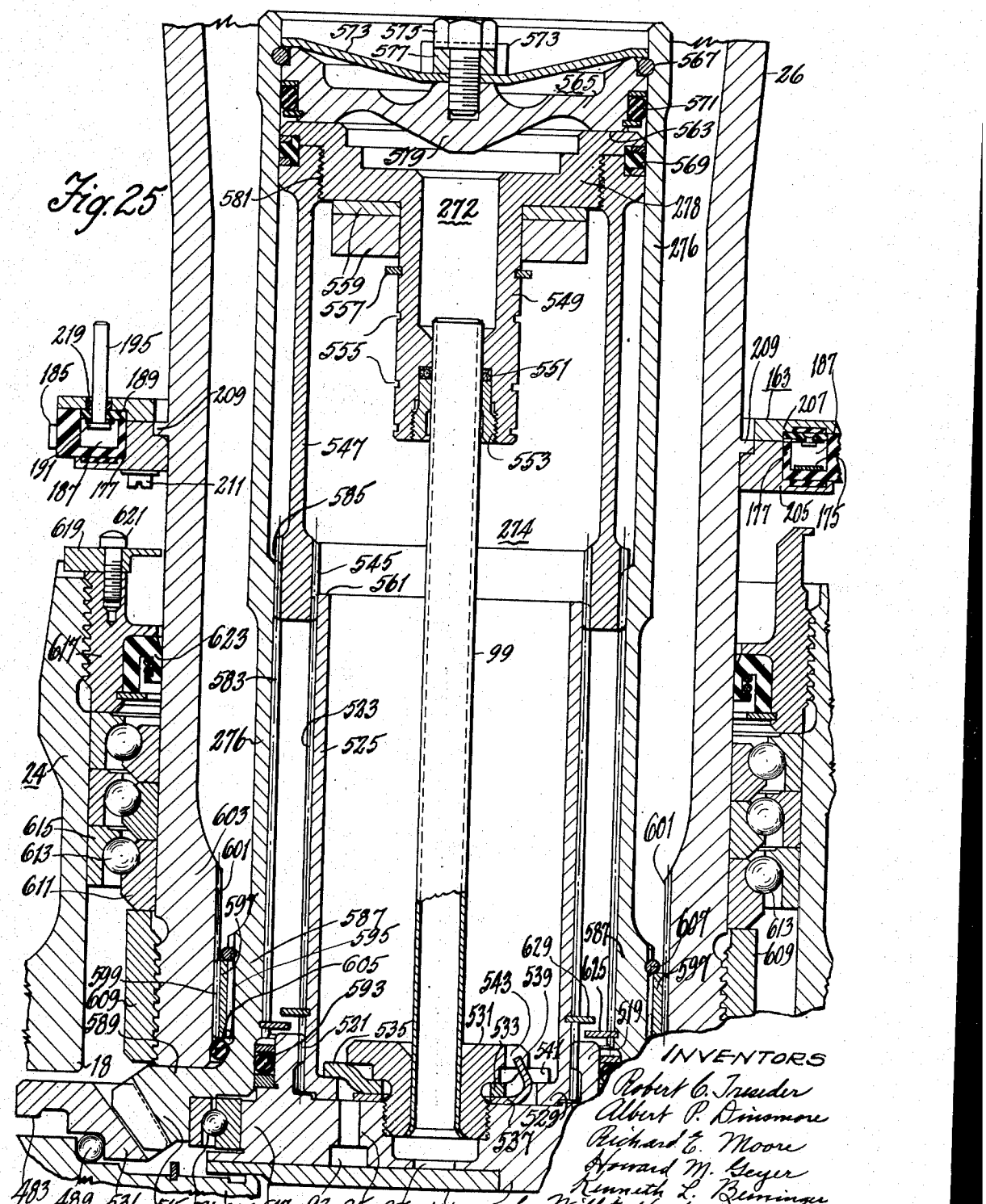

United States Patent Office 2,699,304
Patented Jan. 11, 1955

2,699,304

CONTROL FOR A PLURALITY OF VARIABLE PITCH COUNTERROTATING PROPELLERS

Robert C. Treseder, Albert P. Dinsmore, Richard E. Moore, Howard M. Geyer, and Kenneth L. Berninger, Dayton, Ohio, assignors to General Motors Corporation, Detroit, Mich., a corporation of Delaware Application December 26, 1950, Serial No. 202,612

37 Claims. (Cl. 244—134)

This invention relates to propeller assemblies including variable pitch propeller blades and their controls. More particularly this invention relates to propeller assemblies of the type employing two counter-rotating and coaxial propeller elements driven in opposite directions by the driving engines or turbines, and provides for the control and adjustment of multiplacement counter-rotating aircraft propeller mechanism. By multiplacement propellers there is comprehended a plurality of identical engine-propeller combinations such as installed upon large aircraft and in which the engine-propeller combinations are symmetrically distributed along the wing span of the aircraft.

In the disclosure under consideration multiplacement has reference to a plural number of engine-propeller combinations in which each engine-propeller combination comprises a counter-rotating propeller unit driven by one or more power plants and symmetrically positioned with respect to the medial line of an aircraft. Thus, if two engine-propeller combinations are used, one such engine-propeller combination might be mounted in or upon the wing structure on each side of the fuselage, whereas if four engine-propeller combinations are used then two engine-propeller combinations would be symmetrically disposed on each side of the fuselage. As an alternative an odd number of engine-propeller combinations might be adopted wherein one engine-propeller combination would be mounted on the fuselage axis while the remaining ones, an even number, would be symmetrically disposed with respect to the fuselage.

In this disclosure with respect to engine-propeller combinations, the propeller unit is considered as comprising two counter-rotating and coaxial propeller elements, driven in opposite directions by an engine or turbine or by a plurality of engines or turbines. Each propeller element has its own set of blades with a connecting hub structure securing it to a propeller drive shaft and embodies a hydraulic regulator capable of developing and supplying fluid under pressure and directing the application of that fluid under pressure to reversible blade motors for the purpose of selecting or adjusting the pitch of the respective propeller blades to suit the power and speed conditions under which the engine-propeller combination is to be operated.

A manual control within a pilot's compartment of the aircraft selects the conditions under which each or all of the engine-propeller combinations is or are to be operated, and is coupled to governing and blade angle control means so that the propellers suitably absorb the power developed in order to maintain proper operation of the engine-propeller combination at all times, and generally provides for several regimes of propeller operation, including constant speed operation as well as instantaneous shift to blade angle control for feathering, unfeathering, negative pitch operation, and return to any one of the other regimes. Constant speed or governed speed operation is effected by electronic control means that operates in conjunction with an hydraulic control developed within the respective regulators. One of the hydraulic regulators provides stand-by governors and blade angle control means to supplement or replace the constant speed control effected by the electronic governor.

The hydraulic system of the regulators includes electrically driven pumps with a manual control extending outside the propeller unit so that feathering and unfeathering of the blades may be effected at any time. Since there is no need for constant speed control when the propeller blades are being feathered appropriate switching means are afforded that make it possible to use the input lines from the electronic propeller control for control and actuation of feathering pumps. Appropriate brush and slip ring structure conduct the necessary electric currents to the propeller unit for ice-control of the propeller blades, for control of the hydraulic circuit by the electronic control, and for the feathering pumps.

An object of this invention is to maintain a selected speed of the turbine of a turbo-prop power plant by control of blade angle of the propeller. A further object is to control blade angle outside of the selected speed for the purpose of maneuvering on land or water, and for the purposes of obtaining negative thrust for braking, minimum torque and blade thrust to facilitate starting the turbine, and high positive blade angle for feathering. Propeller blades are referred to as feathered, at negative pitch and at positive pitch when in fact a chord at some reference point along the length of the blade may be at the angle or condition recited. Because of the built-in twist or warp of the blade only one such chord of the blade can occupy the recited condition at a time. The chords of the blade inboard and outboard of the reference point will then be at some different angle of pitch setting, though the reactions of the blade elements at all of those chords may effect a resulting blade operation agreeing with the recited condition. When the blades are referred to as feathered they are then adjusted to such position that the algebraic sum of reactions of all of the blade elements effects a feathered regime of propeller operation, and reference to negative or reverse pitch or angle means that the resultant of all of the blade elements effects a negative thrust or braking regime of propeller operation.

Another object of this invention is to provide a propeller assembly of the aforesaid type, or a plurality of such assemblies symmetrically spaced in the air stream, wherein the pitch of the propeller elements of one or all of the propeller assemblies may be varied automatically to maintain within close limits any selected turbine speed within a governing range, and to permit one or more of the propeller assemblies to be rendered inoperative without affecting the selected regime of operation of any one of the remaining assemblies. A further object is to provide means, in the form of overspeed and underspeed governors, to prevent dangerous overspeed and underspeed operation of the turbines above and below the selected speed, and to provide means whereby the pitch of the blades on the propeller elements of one or more of the propeller assemblies may be adjusted to a value outside of the selected speed to obtain feathering, reverse thrust or minimum torque operating conditions.

In the disclosed embodiment thereof, these and other objects are accomplished by a system of control for propeller blade angle comprising a blade pitch changing servo, a blade angle control device for controlling the servo to obtain blade pitch suitable for propeller operation in any regime including a range of blade angles to obtain a negative or reverse thrust regime of operation, a range of blade angles to obtain a minimum torque regime of operation, a range of blade angles to obtain the feathered regime of operation, a range of blade angles to obtain a selected speed in a governing range for constant speed regime of operation between the ranges of minimum torque regime and the feathered regime, and governing means conditioned for operation by a manual control to maintain the selected speed, by virtue of control of the servo, said governing means concluding an underspeed governor and an overspeed governor.

Further objects and advantages of the present invention will be apparent from the following description, reference being had to the accompanying drawings wherein a preferred embodiment of the present invention is clearly shown.

In the drawings:

Fig. 4A is an enlarged view in section of the drain relief valve.

Fig. 7 is a schematic view illustrating the interconnections of the power circuits and control circuits by which the two propeller elements of any one engine-propeller combination is controlled during any regime of operation.

Fig. 12 is a fragmentary sectional view thru the regulator, substantially as indicated by the line and arrows 12—12 of Fig. 10, and illustrating means for conducting electric current from a fixed slip ring assembly to electric consuming elements carried by a rotatable member.

Figure 10:
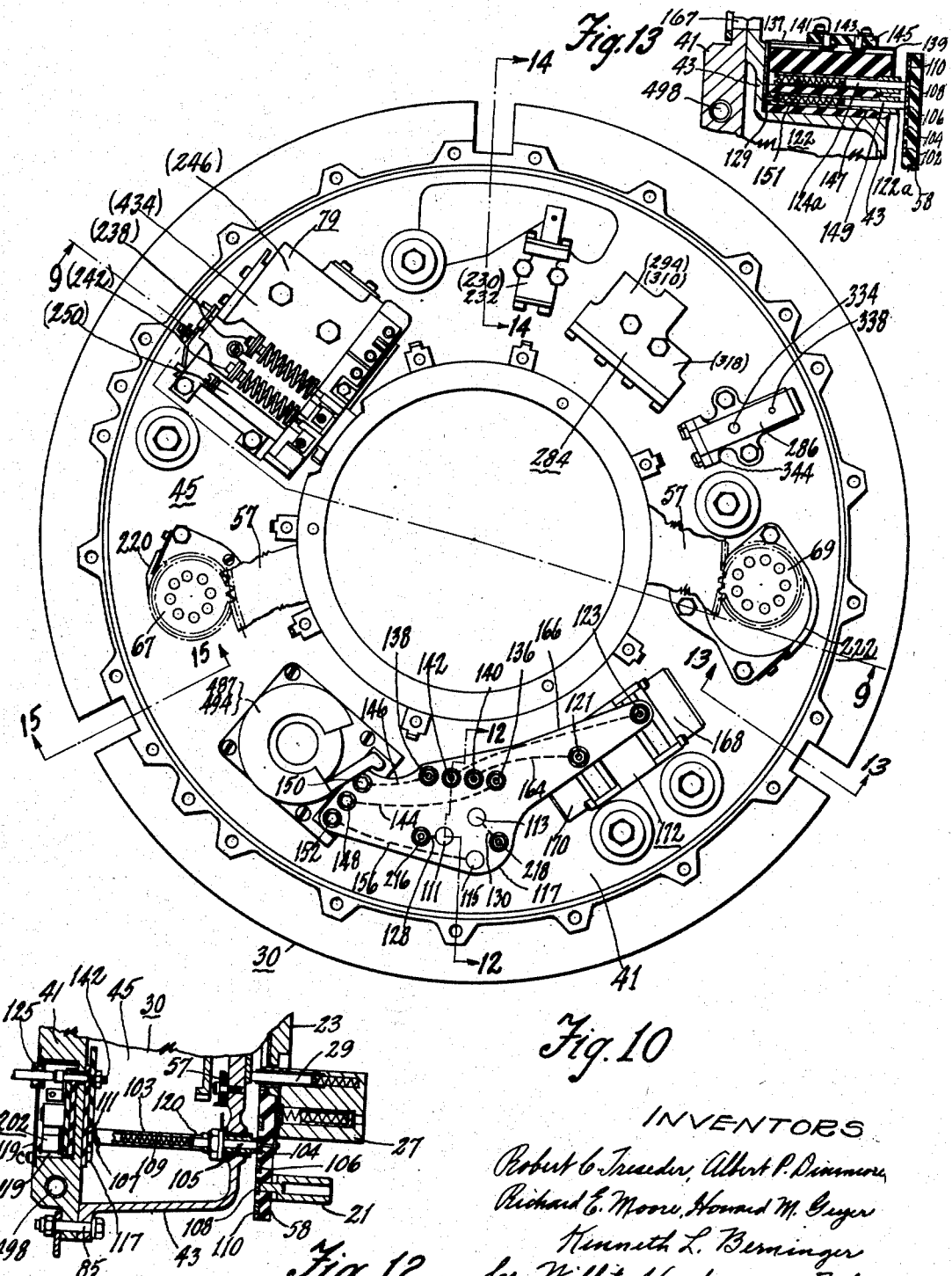
Fig. 10 is an elevational view of the regulator of the inboard element and with the cover removed somewhat as indicated by the line and arrows 10—10 of Fig. 8.

Figs. 13, 14 and 15 are sectional details illustrating methods and means for transmitting ice-control current to the blades of the inboard and outboard propeller elements, substantially as indicated respectively by the lines and arrows 13—13, 14—14 and 15—15 in Fig. 10.

Figure 9:
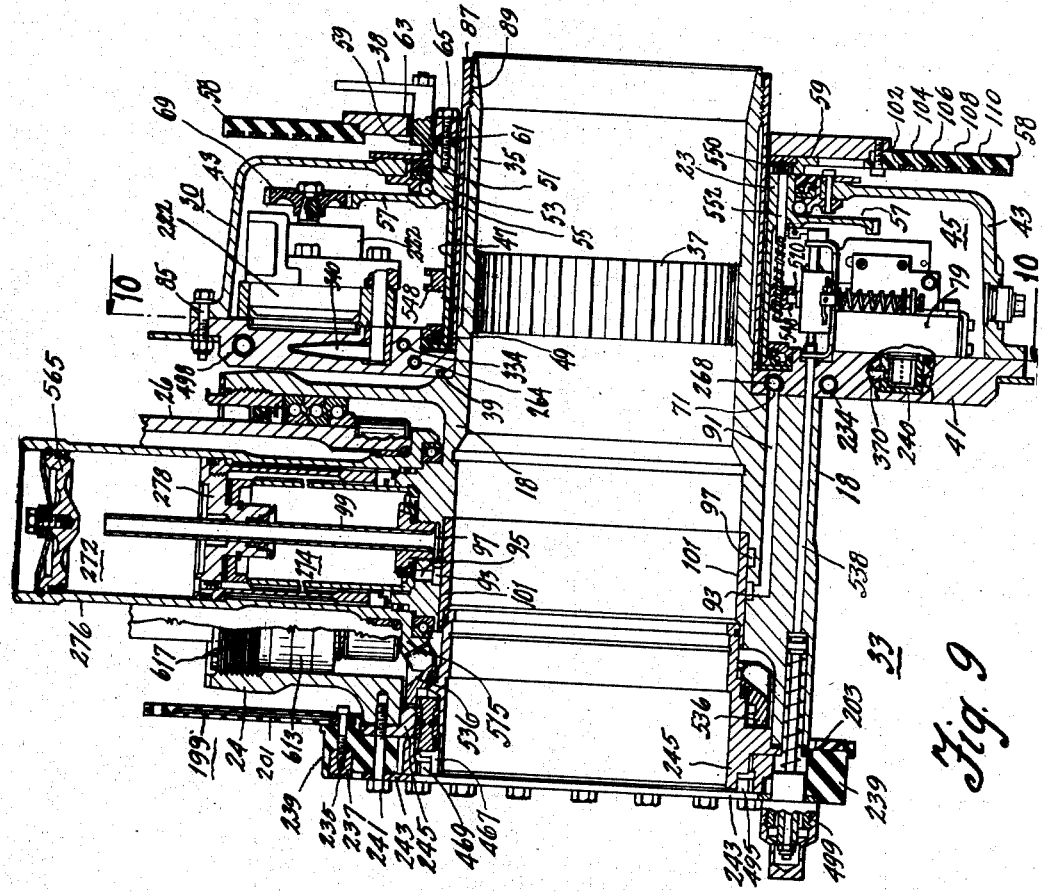
Fig. 9 is a longitudinal sectional view thru the structure illustrated in Fig. 8, the section being taken on plane parallel with the paper.
Figure 16:
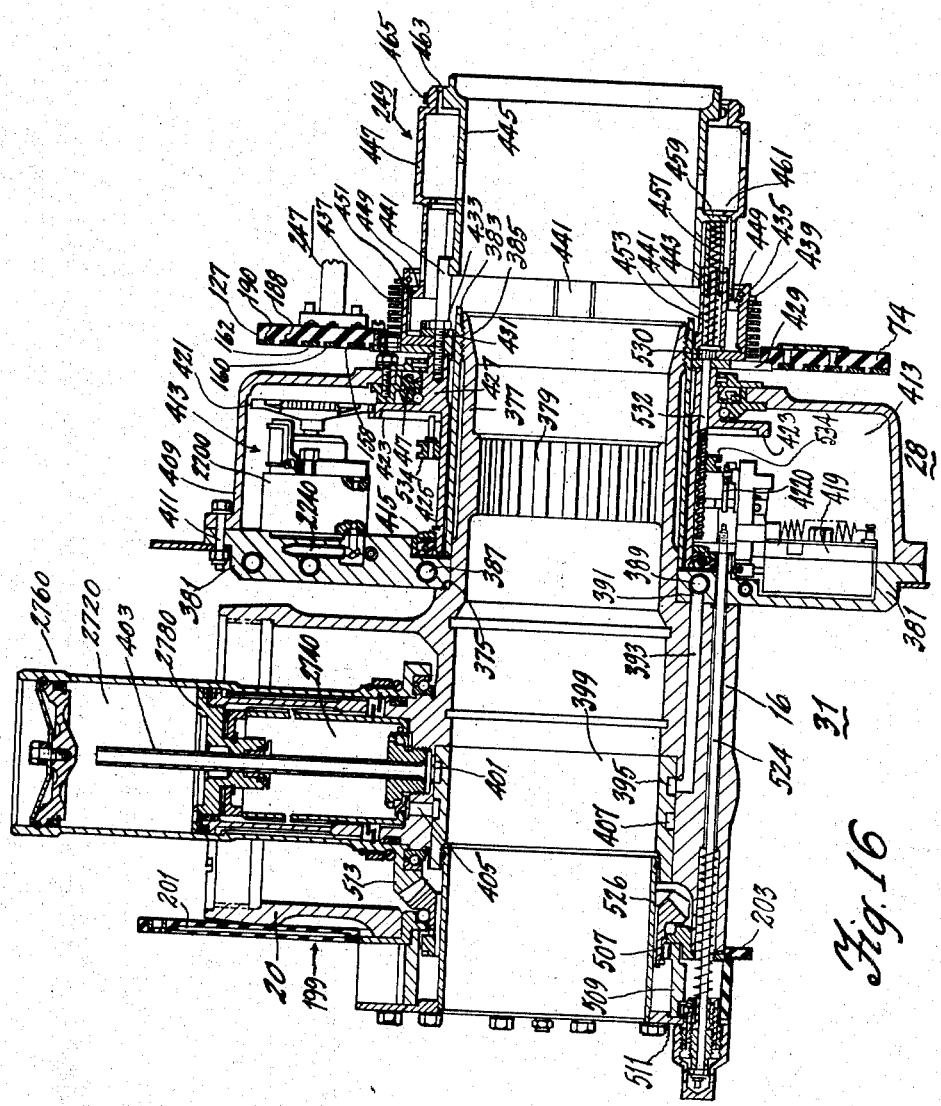

Fig. 16 is a longitudinal sectional view of the outboard propeller element similar to Fig. 9 for the inboard propeller element.

Fig. 17 is a fragmentary view in longitudinal section illustrating means and methods for conducting icing-control current to the counter-rotating propeller elements during propeller operation.

Fig. 18 is a plan view of the same somewhat as illustrated by the arrow 18 of Fig. 17.

Fig. 19 is a sectional view thru the blade pick-up ring somewhat as indicated in the line and arrows 19—19 of Fig. 17.

Fig. 20 is a sectional detail of the brush structure used in Fig. 19.

Fig. 21 is a fragmentary view of the electric harness used in connecting various elements of the icing-control circuit.

Fig. 22 is a longitudinal sectional view illustrating the inter-propeller control means by which the pitch control effected upon the inboard propeller element is transmitted to the control of the outboard propeller element.

Fig. 23 is a view of the governor valve assembly illustrating the method and means of mechanical input thereto and blade angle feed-back as at 23—23 of Fig. 22.

Fig. 24 is an enlarged detail of the blade angle feed-back by which the governor valve assembly assumes its equilibrium position when for operation in any regime the setting of the control mechanism called for has been accomplished.

Fig. 25 is a longitudinal sectional view of the blade angle servo motor used for control of the blade pitch.

Figure 1:
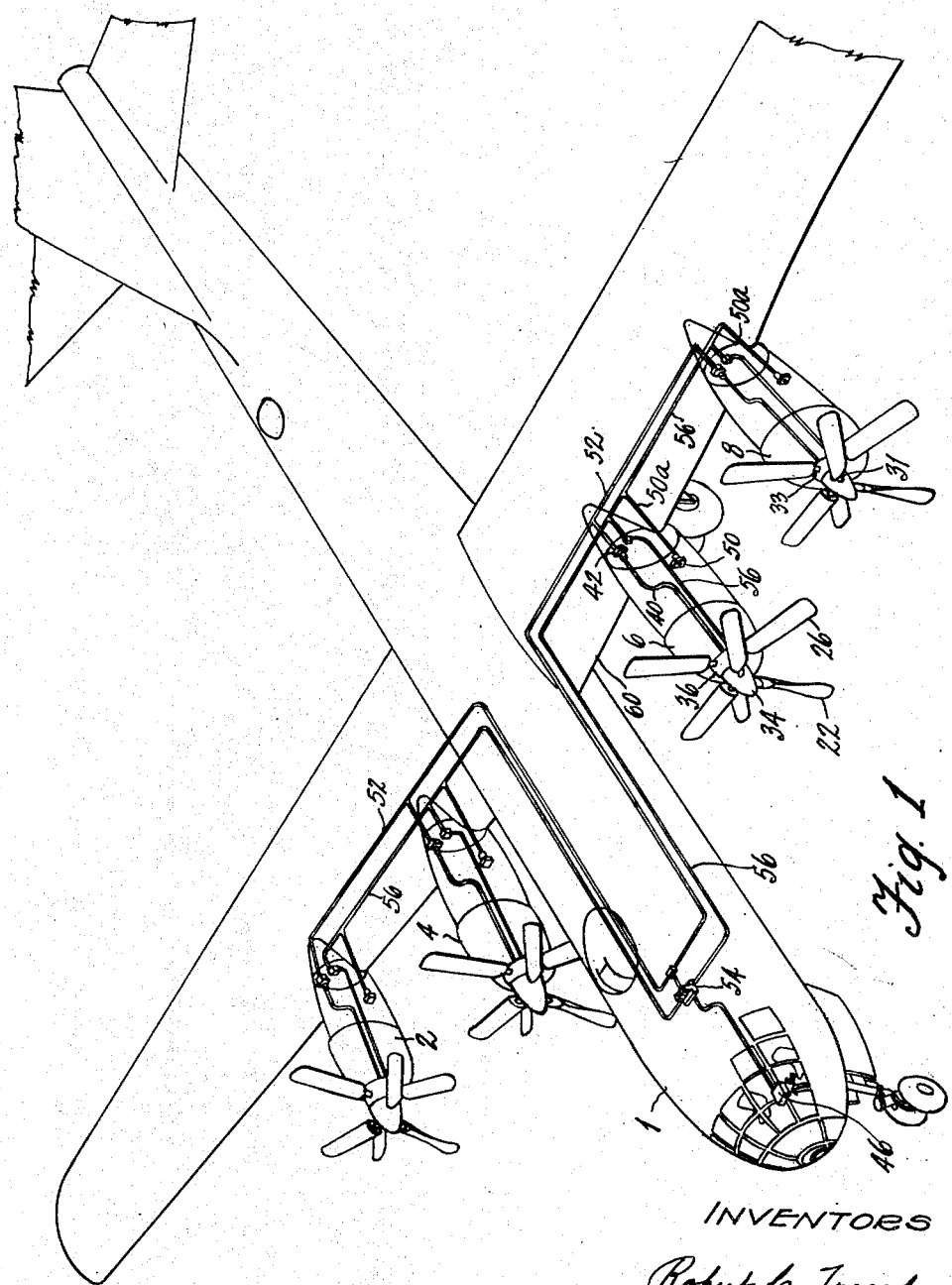
Fig. 1 is a perspective view of a multi-engine aircraft embodying controls for engine-propeller combinations of the instant invention.
Figure 2:
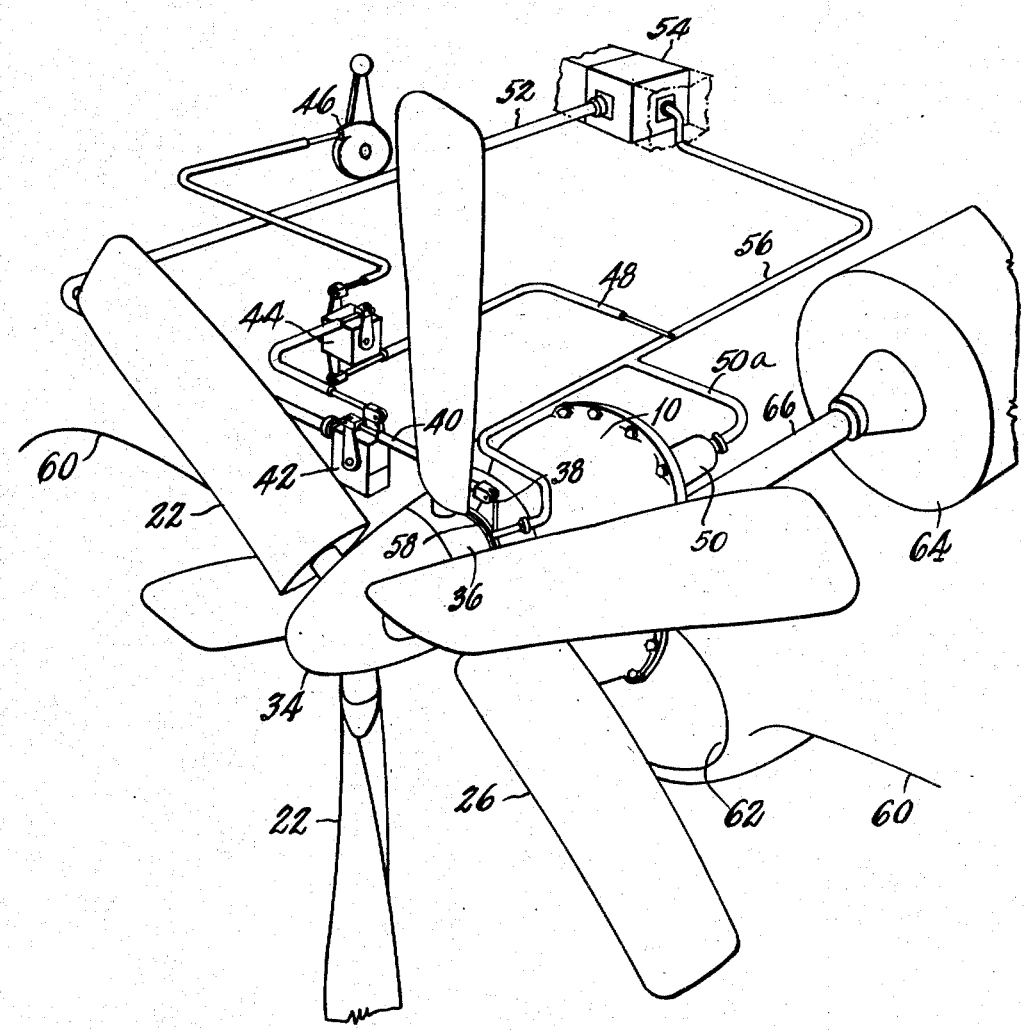
Fig. 2 is a perspective view in schematic form of one of the proposed engine-propeller combinations.

Referring particularly to Figs. 1 and 2, 1 indicates an aircraft having a plurality of engine-propeller combinations 2, 4, 6 and 8 spaced along the wing spread of the craft as shown in Fig. 1. The mounts for the engine-propeller combinations may be in the form of independent housings extending in front of or to the rear of the wing structure as suggested in Fig. 1, or the engine propeller combination may be mounted in and housed by the wing structure somewhat as suggested by Fig. 2. In any event 10 indicates a gear box or other suitable rigid structure of the aircraft, that rotatably supports a pair of concentric and counter-rotating shafts 12 and 14 drivingly engaging propeller hubs 16 and 18 respectively shown in Fig. 22. The hub 16 provides a plurality of blade sockets 20 receptive of pitch shiftable propeller blades 22, and the hub 18 provides sockets 24 similarly journalling propeller blades 26. The outboard propeller element, Fig. 16, is provided with a hydraulic regulator 28 that is always under control of a hydraulic regulator 30 mounted on the hub 18 of the inboard propeller element, the latter operating by reason of the pitch change of its blades 26 to translate their movements to the blades 22 of the outboard propeller element thru the agency of interpropeller control means indicated generally at 32 in Fig. 22. When properly installed the hubs and blade shanks of the two propeller elements are enclosed by spinners 34 and 36.

As indicated in Fig. 2 mechanical control of the inboard propeller element is effected thru a mechanical regulator control 38 with linkage 40 from an actuator 42 having connection with a coordination control 44 mechanically adjusted by a pilot control 46, and which also has a fuel control element 48 communicating with the associated power plant. It is to be understood that in a multi-engine installation, a pilot control 46 and a regulator control 38 are provided for each propeller unit. The actuator 42 is connected by 52 with an electronic or other propeller control 54. Signal voltages from an alternator 50 are delivered through conduits 50a and 56 to control 54, and a control signal leads by 56 from control 54 to appropriate slip rings 58, all as will presently appear.

Figure 6:
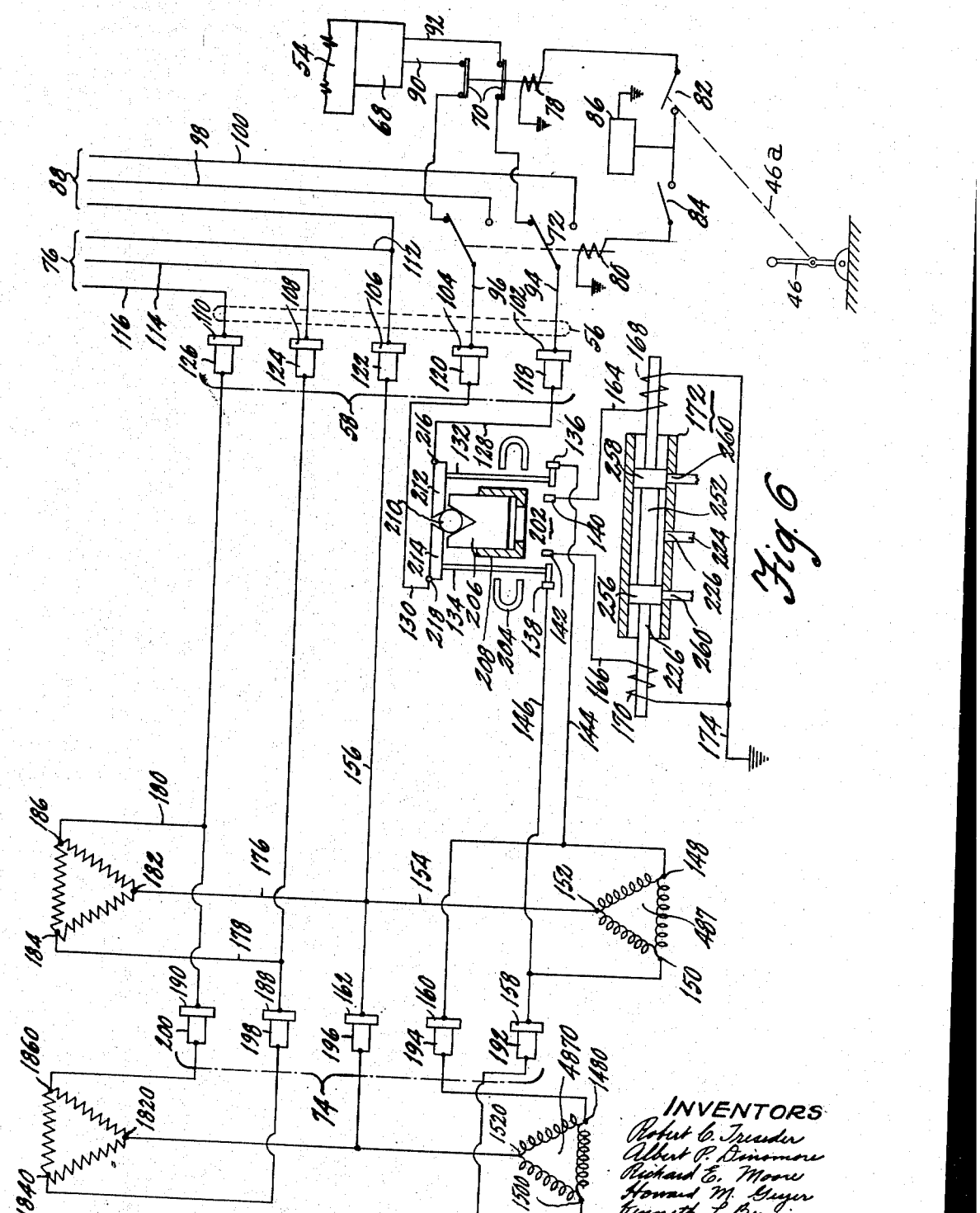
Fig. 6 is a simplified electrical circuit illustrating certain features of the control circuits.

Referring to Fig. 6 the control elements are shown more diagrammatically. A pulsing unit 68 delivers electrical pulses from the governor 54 over conductors 90, 92 and thru switches 70 and 72 to the cable 56 which leads to the brush and slip ring assembly 58 from whence pulses are delivered to the hydraulic regulator of the inboard hub. Thru this same cable 56, leads of a cable 76 connect with appropriate rings and brushes of the slip ring assemblies 58 and 74 to deliver ice-control current to all of the blades 22 and 26 of the inboard and outboard prop as will appear with respect to Figs. 6, 7 and 17. Switch 70 is a cutout switch for the electronic governor and is actuated by relay winding 78 under the control of a switch 82 operated by pilot control lever 46 through linkage 46a, and connected with a current source 86. When winding 78 is energized both leads 90, 92 extending from the pulsing unit 68 are opened such that the electronic governor control is completely disconnected from the propeller unit. Switch 72 is a change-over switch actuated by relay winding 80 when energized thru a manual control switch 84 from the current source 86. Switch 84 is closed when it is desired to feather or unfeather the propeller blades or when the pitch is to be changed while the propeller is at rest. Closing of switch 72 effects the shift of electric energy over conductors 94, 96 from a circuit connection with fine governing leads 90, 92 to wires 98 and 100 within the cable 88 which leads along with 112 to a source of current suitable for actuating the feathering pumps within the regulators of the two propeller elements.

The electronic governor or fine controller 54 may be of the type and construction disclosed and claimed in a copending application Ser. No. 94,984 Dinsmore et al., now U. S. Patent No. 2,669,312, issued February 16, 1954, and reference thereto is made for a complete description thereof. Diagrammatically in Fig. 3 hereof, an electric governor of the Dinsmore type is shown together with the various independent elements and subassemblies comprising a control system adaptable to the present invention. In this immediate description of Fig. 3 it should be understood that the single lines between blocks refer to conduits enclosing one or more electrical connections, while the double lines of cross hatching refer to mechanical connections.

The power plant 64 to be controlled is a gas turbine or other prime mover of this general type, connected to an aircraft propeller within the scope of this invention. In this illustration the load device is a variable pitch propeller of the counter-rotating type in which the angle of attack of the blades may be adjusted by means of fluid motors under control of a governor, or a fine control supplemented by a coarse control. The power plant 64 is directly connected to a three-phase alternator 50 which generates a signal proportional in both amplitude and frequency to the speed of the power plant. One phase of the output signal of the alternator 50 follows two paths, one directly leading to a rectifier and filter circuit RF, by cable 16b and 16c; a D. C. voltage from the rectifier filter circuit RF being limited by voltage regulator VR and which is fed into one side of a bridge circuit BC, to act as a reference voltage for fine speed control. The other path leads by cable 16a thru a manual speed control MS to a rectifier filter circuit RC; a D. C. voltage from which is fed thru an automatic speed control ASC to the opposite side of the bridge circuit as a D. C. control voltage varying as a function of power plant speed for comparison in the bridge with the reference voltage from circuits RF and VR. The pilot's control 46 operating thru the coordination control 44 unbalances a control bridge to actuate a motor for adjusting the propeller governor 38, and coincidentally adjusts the manual speed control MS for selecting the voltage as a function of speed proposed to be compared in the bridge circuit BC. Any error manifests itself in the bridge circuit BC as a differential in voltage and is delivered as bias to the multivibrator 68.

The multivibrator 68 is a pulse forming device which provides a continuous succession of pulses over parallel lines and in alternation first to one side of the solenoid valve 172 and then to the other side. When the engine-propeller combination is operated at onspeed the pulses in the two lines of transmission will be equal in duration, and the dwells of the solenoid valve in the two extreme positions will be equal. If the engine-propeller combination is operating offspeed, then the pulses over the two parallel lines will be differentially altered, the solenoid valve having a longer dwell in the position for correcting the offspeed error than it has in the opposite position. A rate signal is generated in conjunction with the error signal from the bridge BC, and is impressed as bias upon the multivibrator where proportional pulses are formed and amplified for energizing the solenoid valve 172 for introducing a correction into the regulator system of the propeller unit. In this invention the regulator system of the propeller unit is the self-contained fluid pressure system that is generally served by the underspeed governor and the over-speed governor for the coarse-change governing, and the solenoid valve responding to the pulses from the unit 68 to effect a fine change governing control.

As may be seen in Figure 6 there are three separate and distinct electrical input circuits extending from the rigid aircraft structure to the rotating propeller units all of which employ only five conductors in the cable 56 connecting with five slip rings on the assembly 58. Two of the conductors in the cable 56 are leads 94 and 96 leading to slip rings 102 and 104. Slip ring 106 connects with a conductor 112 which is common in the cable 88 and the cable 76. Slip ring 108 and slip ring 110 connect with wires 114 and 116 in the cable 76. As diagrammatically illustrated in Fig. 6 brushes 118, 120, 122, 124 and 126 engage the slip rings 102 to 110 inclusive. Brushes 118 and 120 connect by leads 128 and 130 to movable switch members 132, 134 oscillatable between rest contacts 136 and 138 for the feathering pump and contacts 140 and 142 for the electronic governor control. The rest contacts 136 and 138 connected by leads 144 and 146 with terminal points 148 and 150 of a field winding of an electric motor for driving a feathering pump while terminal point 152 of the field winding is connected by lead 154 which joins lead 156 connecting with the common brush 122 and slip ring 106. Extensions of the leads 146, 144 and 156 connect respectively with slip rings 158, 160 and 162. Governing control contacts 140, 142 connect by leads 164, 166 with solenoid windings 168, 170 of a solenoid actuated governor valve 172 and have a common return connection 174 to ground.

Brushes 122, 124 and 126 are connected by branches 176, 178 and 180 with terminal points 182, 184 and 186 of blade heating elements, and each have extensions connecting with slip rings 162, 188 and 190. It is to be understood that all the structure in Fig. 6 disposed between the brushes 118 to 126, and the slip rings 158, 160 and 162, 188 and 190 are mounted on and rotate with the inboard propeller element. Mounted on and rotatable with the outboard propeller element are the brushes 192, 194, 196 and 198 and 200 that are directly connected respectively to terminal points 1500, 1480, 1520, of the field windings of the feathering motor, and with the terminal points 1820, 1840, and 1860 of the blade heating element.

During non-rotation of the propeller and during rotation below a predetermined R. P. M. a centrifugally actuated circuit selecting device 202 maintains the switch members 132 and 134 in engagement with the rest contacts 136 and 138. Permanent magnets 204 are disposed to assist in maintaining electrical engagement with the rest contacts 136 and 138. A weight or centrifugally responsive member 206 is guided in a well 208 and carries a glass ball or like member 210 engaging arms 212 and 214 of the switches 132 and 134, so that at some predetermined rotative speed of the propeller element the switch devices 132, 134 will rotate about their pivots 216, 218 to shift from one pair of contacts 136, 138 to the other pair 140, 142. Due to the influence of the magnets 204 the disengagement from one pair of contacts and the engagement of the other pair of contacts is effected with a snap action. At idle or at low speeds of propeller rotation the electrical input lines 94, 96 and 112 are normally connected with the field windings of feathering motors of both propeller elements. At some predetermined speed the centrifugal switch 202 will shift the connections to the governing control contacts 140, 142 so that the leads 94, 96, connected with the electronic governor thru the conductors 90 and 92, are connected with the windings of the solenoid valve 172. Under those conditions the solenoid actuated valve 172 is then actuated by the electronic governor 54 to control the fluid circuit and control mechanism within the regulator of the inboard propeller element, and the blade pitch change there effected is translated to the outboard propeller element by means of the inter-propeller control 32, indicated in Fig. 22.

Figure 4:
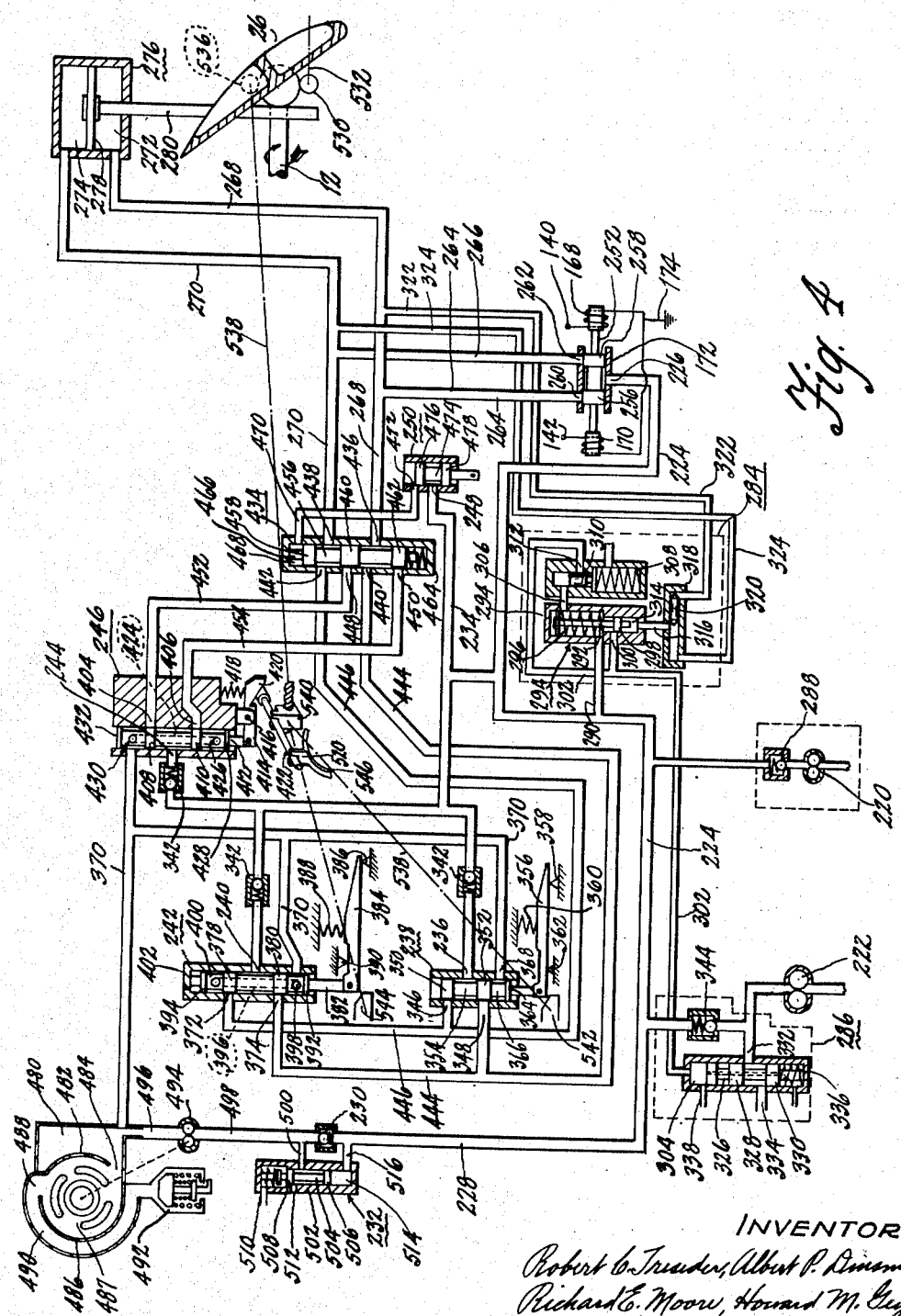
Fig. 4 is a schematic diagram of a power circuit by which one of the propeller elements is controlled.
Figure 5:
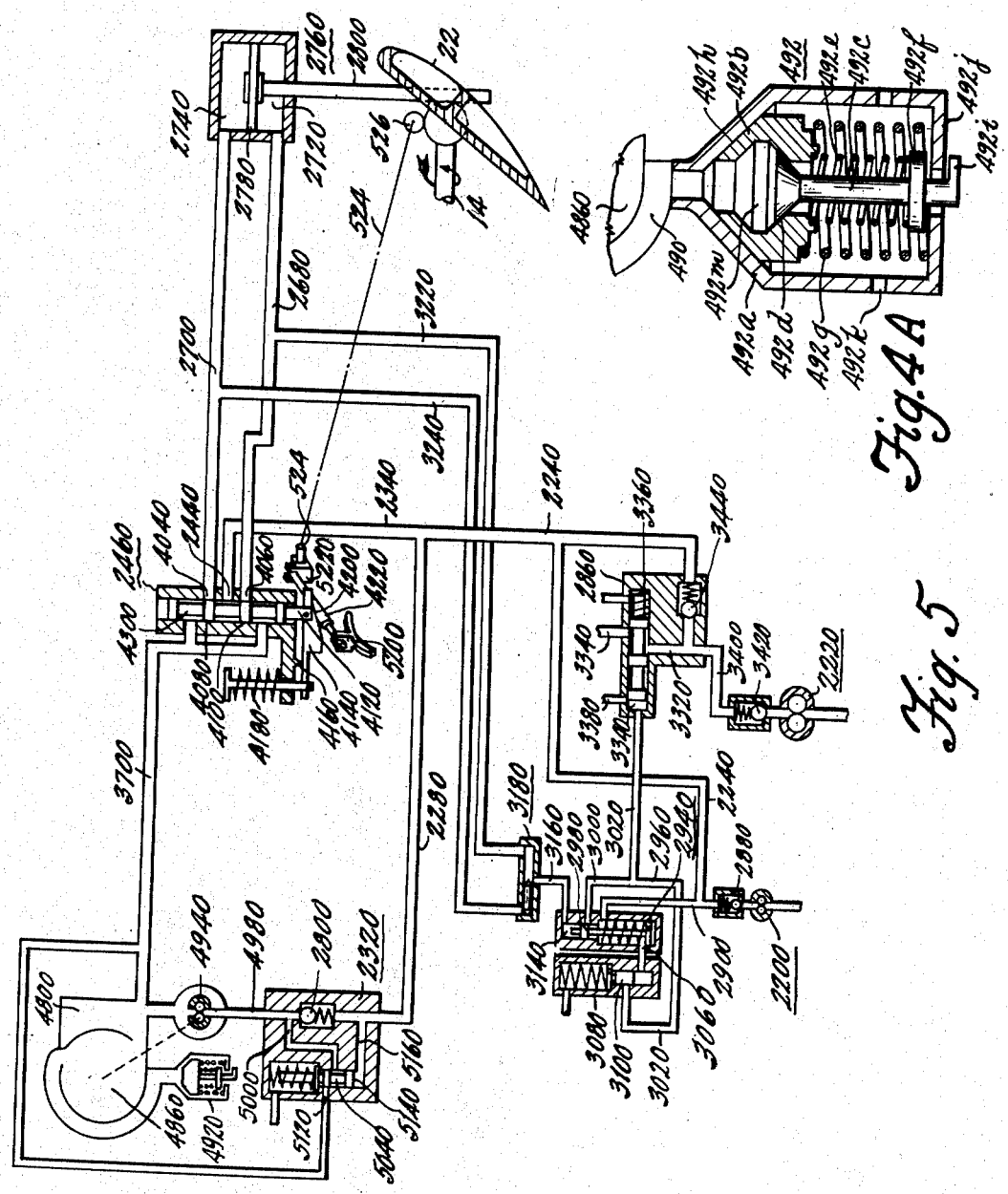
Fig. 5 is a schematic diagram of the power circuit by which the other of the propeller elements is controlled.

The hydraulic circuit by which the regulator 30 operates and is controlled by the solenoid actuated valve 172 is illustrated in Fig. 4 of the drawings. The hydraulic circuit by which the regulator 28 of the outboard propeller element effects its blade angle change is illustrated in Fig. 5 of the drawings while Fig. 7 illustrates the interconnected control of the inboard and outboard propeller elements as they modify and supplement the electronic control. In addition to the structural elements referred to in Fig. 6 as mounted on and rotatable with the inboard propeller, there are the pressure developing means and the hydraulic control element necessary for embodying the flow diagram of Fig. 4 and the structural element there schematically illustrated.

Referring to Fig. 4, there is a system pump or pumps 220 and one or more auxiliary pumps 222 that are driven upon rotation of the inboard propeller element, and operate to feed a high presure line 224 leading directly to a supply port 226 of the solenoid actuated valve 172. While any number of pumps may be used and connected together to provide the system pump and the auxiliary pump, that is generally indicated herein by the use of one pump symbol in each instance of the schematic views of Figs. 4, 5 and 7. The high pressure line 224 has a branch 228 connecting with a check valve 230, and a feather pump control valve 232. A second branch 234 of the high pressure line connects with a supply port 236 of an overspeed governor 238, with a supply port 240 of an underspeed governor 242, with a supply port 244 of a blade angle distributor valve 246 and with a supply port 248 of a selector control valve 250. The solenoid actuated valve 172 provides a plunger 252 having lands 256 and 258 adapted to control pressure applying ports 260, 262 that open into conduits 264, 266 joining control passages 268 and 270 leading to a decrease pitch chamber 272 and an increase pitch chamber 274 of a blade actuating servo 276. The blade actuating servo 276 embodies a piston 278 operating by a rod 280 to rotate the propeller blade 26 within a respective socket 24 upon its pitch changing axis.

In order that the potential of pressure and the flow of fluid may be maintained within the high pressure line 224 and its several branches to the control valves and blade shifting servos, a variable pressure control unit 284 and a pump control valve 286 are incorporated into the system. Minimum pressure potentials are thereby imposed upon the high pressure line when little or no fluid flow is required by the elements of the hydraulic control, and, adequate pressure potential and fluid flow are immediately provided and proportionately applied, should any control function require greater pressure potentials or fluid flow. During a condition of onspeed propeller operation, or under any condition where little or no fluid flow is demanded, only the system pump 220 will be discharging thru its check valve 288 into the high pressure line 224. A branch 290 on the output side of the check valve 288 leads to a chamber 292 of a presure control valve 294, there being a spring pressed plunger 296 having a valving piston 298 sensitive to the pressure in the chamber 292 for movement to open port 300 to a line 302 leading to an actuating chamber 304 of the pump control valve 286.

Centrifugal force due to rotation of the propeller acts upon the plunger 296 to assist the spring in keeping the port 300 closed, thus opposing the action of the high pressure line in the branch 290 and chamber 292 tending to open the port 300. A passage 306 connects the chamber of a relief valve 308 where the pressure of the line is applied against a piston 310 for unloading the pressure line thru port 312 connected by an extension of passage 302 with the chamber 304 of the auxiliary pump control valve 286. Also opposing the blow-off of the pressure control valve 294 there is a chamber 314 exposing the opposite side of the valving piston 298 to pressures applied to either chamber of the blade actuating servomotor 276. A channel 316 opens to a shuttle valve 318 which carries a valve member 320 reversibly shiftable by reason of pressure applied to passages 322 and 324 communicating with control passages 268 and 270 respectively.

The system pump 220 feeds into the high pressure line 224 whenever the propeller is rotating. Should there be little or no call for control movement of the blades the pressure in 224 will penetrate to the chamber 292 of the pressure regulator valve 294, and when that pressure exceeds that necessary to provide the fluid flow called for will act upon the face of piston valve 298 to open the port 300 allowing fluid flow from the chamber 292 thru the passage 302 and to the chamber 304. Closing one end of the chamber 304 there is a valve plunger 326 with spaced lands 328 and 330 that control fluid flow from pumps 222 thru pressure port 332 to a pump exhaust port 334. The plunger 326 is normally urged by a spring 336 to an upward position, as shown to close the pump exhaust port 334 and a pressure drain port 338. The pressure port 332 connects by passage 340 with the outlet side of auxiliary pump 222. While the auxiliary pumps 222 operate continuously so long as the propeller element rotates, they either discharge thru port 332 and 334 into the reservoir, or feed into the high pressure line 224 thru a check valve 344 as is determined by the conditions of flow and pressure within the passage 302 and 304.

So long as there is a blow off of pressure or flow of fluid thru the port 300 from chamber 292 and into the passage 302 which leads to 304, the plunger 326 will be moved to compress the spring 336 and open the drain ports 334 and 338. Under that condition, the auxiliary pumps 222 will have their outputs returned to the reservoir without passing thru the check valve 344. Should the pressure and flow demands be greater than what the system pump 220 with the pressure control valve 284 provides, then valving piston 298 closes port 300 and the pressure in passage 302 and chamber 304 will be insufficient either to hold or move the plunger 326 against the spring 336. Hence, the drain ports 334 and 338 will be closed so that the output of the auxiliary pumps 222 is now delivered thru the check valve 344 to the high pressure line 224. Additional pressure developing means are available and operated under manual selection to supply the high pressure line thru the branch 228, but will be better understood in connection with subsequent description of some of the control elements.

In this manner a suitable potential of pressure and fluid flow is always available at the pressure ports 226, 236, 240, 244 and 248, so that sufficient fluid flow and pressure may always be available for application thru the control passages 268 and 270 leading to the chambers 272, 274 of the blade actuating servo 276. The solenoid actuated valve 172 distributes fluid pressure from the pressure port 226 thru the channels 264, 266 in performing its governing function to constant speed. The electronic governor 54 with its pulsing unit 68 operates upon the solenoid actuated valve 172 to keep it under constant short amplitude reciprocation whereby small and equal pulses of fluid pressure and flow are alternately distributed thru the channel 264, 266, and upon the occurrence of any offspeed the governor 54 differentially modifies the alternate pulses so that a proportionate movement of the servo-motor piston 278 will actuate the blade 26 in the proper direction and amount to correct the offspeed.

Under certain conditions other functions than governing, or control to constant speed are desired. Also, a manual selection of propeller operating conditions may call for greater blade angle change than what the solenoid actuated distributor valve 172 may accomplish within a suitable or desired unit of time. On the other hand, it may be desirable to apply full manual control for changing the blade angle setting. One or more of these conditions or regimes of propeller operation may be the result of actuating the regulator control 38.

In Fig. 4 the overspeed governor 238 provides an increase pitch port 346 and decrease pitch drain port 348 spaced on either side of the pressure port 236 and adapted to be covered by valving lands 350, 352 of a valve plunger 354. The plunger is pivotally connected to a lever 356 whose free end rests on a fixed fulcrum 358, the lever being urged by a spring 360 toward engaging a stop 362. A guide land 364 on the plunger 354 is spaced from the land 352 by an annular channel 366 which is the rest position illustrated is open to drain port 368 connected to pipe 370.

The underspeed governor 242 provides a pitch increase drain port 372 and a pitch decrease port 374 adapted to be covered by valving lands 378, 380 of a valve plunger 382 pivotally joined to a lever 384 engaging at one end a fixed fulcrum 386 and urged by a spirng 388 away from a fixed stop 390. The plunger 382 also provides a guide land 392 spaced from the valving land 380, and a guide land 394 spaced from the valve land 378. An internal channel 396 of the plunger 382 connects the annular groove 398 between the land 380 and 392 with the annular space 400 between the lands 378 and 394, and is always open to drain 370. A valve stop 402 engaging the end of the valve casing prevents movement of the valve 382 beyond a fixed point in the speed increase direction, and cooperates with the lever stop 390 to prevent the underspeed governor from applying an increase pitch change.

The blade angle distributor valve 246 shown diagrammatically in Fig. 4 has a pitch increase port 404 and a pitch decrease port 406 disposed on either side of the pressure port 244. The ports 404 and 406 are adapted to be covered by valving lands 408 and 410 of a valve plunger 412 pivotally connected to lever 414 pivotally supported at 416, the free end of said lever being urged by a spring 418 to maintain a cam surface 420 in engagement with one end of a floating lever 422. A longitudinal bore 424 extending along the valve plunger 412 connects an annular space 426 between a guide land 428 and the valving land 410 with an annular space 430 between a guide land 432 and the valving land 408 so that bore 424 is always open to drain 370. A selector valve 434 provides a pitch decrease control port 436 and a pitch increase control port 438 opening at all times to the control passages 268 and 270 respectively. A pair of normally open ports 440 and 442 connect by passages 444 and 446 with the overspeed governor 238 and the underspeed governor 242.

Passage 444 connects with the decrease pitch drain port 348 of the overspeed governor 238, and with the pitch decrease port 374 of the underspeed governor 242. Passage 446 connects the port 442 of the selector valve 434 with the pitch increase port 346 of the overspeed governor 238 and with the increase pitch drain port 372 of the underspeed governor 242. A pair of normally closed ports 448 and 450 of valve 434 connect by passages 452 and 454 with the increase pitch port 404 and decrease pitch port 406 of the blade angle distributor valve 246. Movable within a casing of the selector valve 434 there is a valve plunger 456 having spaced valving lands 458, 460 and 462 urged by a spring 464 to such position that valving lands 460 and 462 normally cover spaced ports 448 and 450 and so that ports 440 and 442 are normally connected with the control ports 436 and 438 by means of intervening annular grooves between adjacent lands, a stop 466 resisting the spring 464 and maintaining the normal position of the valve. Between the land 458 and abutment for the stop 466 there is a pressure chamber 468 that leads by passage 470 to a port 472 of the selector control valve 250. Movable within the bore of the selector control valve 250 there is a spool valve 474 having spaced lands 476 and 478 adapted when in proper position to span or connect the pressure port 248 with a port 472. The spool valve 474 is moved by or incident to movement of the propeller control lever 38 which primarily selects the particular propeller operation.

In the position shown in Fig. 4 the hydraulic control elements are positioned and connected to operate as a standby governing mechanism, while the solenoid actuated valve 172 is applying the governing function by means of the electronic control 54. If the regulator control 38 is moved to select other than governed or constant speed propeller operation, the selector control valve 250 is moved to a position to connect ports 248 and 472 which allows high pressure from port 248 to flow to the pressure chamber 468 which depresses valves 456 or moves it against spring 464 until ports 440 and 442 are closed under which conditions ports 448 and 450 will be connected to control passages 270 and 268 respectively. To insure that the pressure line 224, 234 will always carry enough potential for actuation of the selector control valve 250, a restrictor valve 342 is inserted in each of the branches 234 leading to the pressure supply ports 236, 240 and 244 of the overspeed governor 238, the underspeed governor 242 and the distributor valve 246 respectively. The restrictor valve is in the nature of a poppet valve included on the pressure side of each of the valve units in order to maintain a minimum pressure in the pressure supply line of something like 100 p. s. i. If a pressure of approximately 50 p. s. i. is all that is required to move the servo-motor piston 278, it might be possible during a large blade angle change without the restrictor valve to bleed the system pressure down to 50 p. s. i. thru rapid movement of the servo-motor pistons. The danger would then be present of having insufficient pressure available to keep the selector valve 434 open against the spring pressure. The restrictor valves will not open and admit pressure to the distributor or other valves unless the system pressure is in excess of 100 p. s. i., and that insures adequate pressure in the line to keep the selector valve open whenever system pressure is admitted thru the selector control valve 250. Shifting of the selector valve plunger 456 operates to change the connections of the pitch control ports 436 and 438 from underspeed-overspeed governor control to distributor valve or blade angle control. Hydraulic control in either instance is applied to one of the control passages 268 and 270 and thus to one chamber or the other 272, 274 of the blade servo motor 276. Whenever there is flow of fluid into one of the chambers 272, 274 there will be a return flow or drain from the other chamber. As an example, if there is a condition of overspeed, and if the overspeed governor is effecting control to correct the overspeed, the valve plunger 354 of the overspeed governor will move upward to connect the pressure port 236 with the pitch increase port 346 which will then apply the high pressure thru line 446 and ports 442, 438 of the selector valve and control passage 270 to the pitch increase chamber 274 of the blade servo motor 276. The fluid in the pitch decrease member 272 returns thru control passage 268 ports 436 and 440 of the selector valve and by way of passage 444 and decrease drain port 348, groove 366 and port 368 to drain passage 370.

The drain from all valves is collected by passage 370 and is led to a sump 480. The drain from pitch increase chamber 274 in the illustrated position of the selector valve would be thru passages 270 and 446 to increase pitch drain port 372, annular channel 400, bore 396, and channel 398 to drain passage 370. In the shifted position of the selector valve 434 drain from the blade servo chambers 274, 272 would be thru passage 268, or 270 and 452 or 454 to either the channel 426 or 430 of distributor valve 246, and thence thru drain passage 370. If that drain is to channel 426 then it would also flow thru channel 424 to the annular space 430 and thence to 370. Thus, the drain from all control valves, with the exception of the solenoid actuated valve 172, is collected by the drain passage 370 and returned to the sump 480 from where it passes by openings 482 and 484 to the interior of an electric motor housing 486, and thence thru opening 488 to a scroll chamber 490 opening to the main reservoir through a relief valve 492 somewhat as shown in Fig. 4A. The valve serves a dual purpose, that of returning drain-off fluid from the passage 370 to the reservoir when the feathering pump 494 is not operating, and that of keeping the sump 480 and motor housing 486 filled with fluid medium so that the feathering pump 494 is always primed. The scroll chamber 490 empties into a housing 492a containing a valve assembly having a crown member 492b and a plunger 492c disposed within the crown to seat at 492d under the urge of a light spring 492e engaging the crown and a collar or the like 492f of the plunger 492c. The crown 492b is urged by a spring 492g in sealing relation against the inside of the housing 492a as indicated at 492h. As top lug 492i of the plunger 492c is spaced enough from the collar 492f to loosely receive a portion of the end member 492j for the housing, and the housing opens to the outside at the ports 492k. Under the urge of springs 492e and 492g the crown 492b, and plunger 492c, seal at 492h and 492d to form a chamber 492m always open to the scroll 490. Fluid under pressure in that chamber can exhaust through 492h and fluid intake can enter that chamber through 492d, as the same are opened by the pressing of springs 492g and 492e respectively.

By this means, a motor 487 is immersed in the drain of fluid from the blade actuating servos and is kept at a satisfactory working temperature. The electric motor 487 is controlled thru the cable 88 and drives a pump 494 when desired to withdraw fluid from the sump 480 thru passage 496, and delivers fluid thru 498 and the check valve 230 opening to the branch 228 of the high pressure line 224. A passage 500 connects 498 with the bore 502 of the feathering pump control valve 232. Movable within the bore 502 is a plunger 504 with spaced lands 506 and 508. The plunger 504 is urged by a spring 510 to a position for closing exhaust port 512 but is yieldable enough upon development of pressure in chamber 514 to move to a position connecting port 512 to passage 500. The chamber 514 is always open by passage 516 to the branch 228 connecting with the high pressure line 224. When the potential of pressure within the high pressure line is satisfactory for the selected function to be performed, pressure in chamber 514 will raise the plunger 504 against the spring 510 to connect 500 with 512 so that output from the feathering pump 494 will be returned to the main reservoir without passing thru the check valve 230.

When the pressure in the line 224 is insufficient, or undesirably low for performing the function called for, the pressure within chamber 514 will be insufficient to compress spring 510 which permits the valve 504 to close off 512 from its connection with passage 500. Then, operation of the feathering pump will feed thru 498 and check valve 230 and branch 228 to the high pressure line.

The hydraulic circuit by which the blades 22 of the outboard propeller element are controlled is less complicated as is illustrated in Fig. 5, since the control mechanism for the outboard propeller element follows the instructions of the inboard propeller element. Except for minor changes in some of the control valves, and the omission of other control elements, all of the control structures of the outboard propeller element are the same, and their fluid circuit connections are the same as their counterparts in the inboard propeller element. Therefor, the same reference characters have been used with the addition of a zero in the tens place which is generally indicative of the fact that the numbers ending in zero relate to the control elements of the outboard propeller element.

With reference to Fig. 5, the hydraulic system for the outboard propeller element includes a system pump 2200 feeding thru a check valve 2880 to the high pressure line 2240 which leads by branch 2280 to a feather pump control valve 2320, and by a branch 2340 to a pressure port 2440 of a blade angle distributor valve 2460. A branch 2900 connects the high pressure line 2240 with a pressure control valve 2940 whose discharge line 3020 connects with the pressure chamber 3340 in the pump control valve 2860. Thus, under certain conditions the auxiliary pump 2220 may feed into the high pressure line 2240 when the system pump 2200 is not supplying sufficient flow for the control function selection. That is controlled in part by the feed backs 3220 and 3240 to the shuttle valve 3180, and to the pressure chamber 3140 of the pressure control valve whenever a control function is applied thru one of the control passages 2680 or 2700. In this hydraulic system the control passages 2680 and 2700 are controlled solely by the blade angle distributor valve 2460. This valve has a valve plunger 4120 with lands 4080 and 4100 that cooperate with ports 4040 and 4060 for the distribution of high pressure at the supply port 2440 to either the increased pitch line 2700 or the decrease pitch line 2680. As a control force is distributed to one of the control passages 2680 and 2700 for actuation of the servo piston 2780 the other side or passage is connected to drain thru passage 3700 which leads back to the casing of the motor and feathering pump 4940. The electric driven pump under control of the pump control valve 2320 adds to the high pressure line 2240 thru the branch 2280.

The blade angle distributor valve 2460 provides a rocker arm 4140 pivotally connecting the valve plunger 4120 and pivots at 4160 under the influence of a spring 4180 to engage a cam surface 4200 into engagement with the central portion of a floating lever 4220. One end of the lever 4220 is carried by a yoke or shoe 5200 riding in a control ring for actuation by the regulator control arm 38 as will presently appear. The opposite end of the floating lever 4220 is carried by a yoke 5220 actuated by a screw shaft 524 having a pinion 526 actuated by movement of the blade 22. To that extent any movement of the shoe 5220 shifts the valve plunger 4120 with respect to the control ports 4040 and 4060. The control force thru either one of passages 2680 or 2700 operates upon the piston 2780 to move it and change the inclination or pitch of the blade 22. The blade upon experiencing a pitch change movement rotates the pinion 526 and screw shaft 524 in such direction as to shift the yoke 5220 and oscillate the floating lever 4220 for corrective or follow up adjustment of the valve plunger 4120. In other words, movement of the shoe 5200 to effect a blade angle change distributes fluid pressure into one or the other of the chamber 2720 or 2740. Resulting movement of the blade 22 restores the valve plunger 4120 to a recovery position.

In Fig. 7, the fluid circuits for the inboard and the outboard regulators have been shown in their controlling relation, with mechanical interaction and feed back, and subject to the control intelligence applied from the cable 56. In that view, the light solid single lines generally relate to electrical conductors and circuits, while paired and doubled light face continuous lines indicate pipes and passages for the valve and control structure. Open ended passages and pipes are connected by solid heavy faced lines for the power passages and conduits, and the pipes and passages are connected dashed lines indicative of the controlled passages, or those subject to pressure and drain. Extension of mechanical and moving parts is indicated by light dot and dash lines.

As illustrated in Fig. 7, the movement of the yoke 5200 is accomplished by the pitch change movement of the blade 26 of the inboard propeller unit. A rotatable pinion 530 on the end of a screw shaft 532 threads into a shiftable control ring 534, and upon the instance of any pitch shift movement of the blade 26 in the inboard propeller element effects linear movement of the control ring 534 in the outboard propeller element. The control ring 534 is grooved and the yoke 5200 has a shoe portion that always follows the groove of the control ring, and in doing so swings the floating lever 4220. At that time the yoke 5220 acts as a fixed point about which the lever swings or pivots. Consequently, the middle portion of the floating lever 4220 slides or rolls along the cam portion 4200 and shifts the valve plunger 4120 for a distributing function with respect to the control ports 4040 or 4060.

In the inboard propeller unit a second pinion or the like 536 is rotated whenever a pitch shift movement of the blade 26 occurs and in doing so rotates a screw shaft 538 that provides a blade angle feed back to the control elements of the inboard propeller element. The screw shaft 538 therefore actuates a yoke member 540 providing a mid-point support for floating lever 422 of the inboard blade angle distributor valve 246 and also threads into a wedge member 542 in the overspeed governor assembly 238 and a wedge 544 in the underspeed governor assembly 242. Thus, whenever any pitch shifting movement of the blade 26 occurs there is effected lineal movement of the yoke 540 and both of the wedges 542 and 544. At that time the yoke 520 associated with the blade angle distributor valve 246 acts as a fixed point since it has a shoe riding in a groove of a control ring 548 of the inboard propeller element. Therefore, the floating lever 422 oscillates or swings with respect to the yoke 520 and moves up or down the cam portion 420 of the lever 414. The relation and character of the pinion 536 and screw shaft 538 with the yoke 540 is such that when the blade 26 increases pitch, then the resulting movement of the valve stem 412 is such as to again cover the increased pitch port 404 by the time the blade 26 has reached the selected point of pitch increase. The wedges 542 and 544 of the overspeed governor assembly and the underspeed governor assembly are so disposed with respect to their associated valve plunger elements 354 and 382 that they will be out of the path of normal movement of those valve elements when the inboard propeller element is operating under governed pitch control. However, when the blade 26 decreases pitch far enough the wedges 542 and 544 will be projected beneath the valve stems 354 and 382 respectively so as to force them to a pitch increasing position. In that position the valve plunger 354 connects the source port 236 with the pitch increase port 346 of the overspeed governor, and the plunger 382 stops fluid movement from the source port 240 thru either of the ports 372, 374 by reason of lever 384 engaging stop 390. The line 446 however connects with the groove 456 of the selector valve 434 and from there by way of control passage 270 to the increase pitch chamber 274 of the blade actuating servo which results in movement of the piston 278 in a direction to increase pitch of the blade 26.

That action of the blade feed back upon the wedges 542 and 544 takes place only upon predetermined settings or selections of blade angle movement, effected thru manipulation of the mechanical regulator control 38. As schematically illustrated in Fig. 7 the regulator lever 38 rotates a pinion 550 on a screw shaft 552 that threads into the control ring 548 linearly movable within the regulator 30 of the inboard propeller element. For the purpose of illustration, Fig. 7 shows the control ring 548 as comprising two elements, associated one with the blade angle distributor valve 246 and the second associated with the selector valve control element 250. However, there is but one control ring 548 in each of the propeller elements. With respect to the blade angle distributor valve 246, the control ring 548 and the shoe 546 form a shiftable fulcrum point for the floating lever 422. With respect to the selector control valve 250 the same control ring 548 receives a shoe 554 for moving a cam plate 556 for actuation of the valve plunger 474. Actuation of the regulator control lever 38 therefore selects the speed level at which the propeller mechanism shall operate. It also, if actuated far enough, takes the propeller operation away from the governor control and establishes propeller operation at some particular blade angle setting.

By deliberate and selected operation, the regulator control 38 can demand blade angle operation for feathering of the propeller, and negative pitch operation. The feathering and negative pitch operation are both certain phases of blade angle control and come about by shift of the cam plate 556 for operation of the selector valve 434. Near either extreme of range of movement for the lever 38 the control valve 250 is shifted so as to connect ports 248 and 472 which applies fluid pressure from the line 234 to the chamber 468 of the selector valve. The valve plunger 456 is then moved to such position as to cut off the overspeed governor 238 and the underspeed governor 242 from the blade angle servo 276, and connect the control ports 404 and 406 directly with the control passages 270 and 268 leading to the blade angle servo 276. Depending upon the direction and extreme to which the lever 38 is moved, the blade angle distributor valve 246 will then have one of its control ports wide open to one of the chambers of the blade angle servo, and the other chamber of the blade angle servo will have a wide open connection to drain. In this operation, the yoke 540 of the blade angle distributor valve acts as a fixed pivot point for swinging movement of the floating lever 422. If the control lever 38 is actuated such that the floating lever 422 swings clockwise about the yoke 540, then the resulting action upon the lever 414 will be to move the valve plunger 412 downwardly, connecting the pressure port 244 with the pitch decrease port 406, which now, by reason of the shifted position of selector valve 434, connects directly thru 268 with the pitch decrease chamber 272 of the blade angle servo 276. The resulting movement of the blade 26 is to reduce its pitch setting, and if the lever 38 is left in the assumed extreme position the blade 26 will take up a reverse pitch position and result in a negative thrust.

If on the other hand movement of the lever 38 is such as to cause counterclockwise swing of the floating lever 422, then the valve plunger 412 moves upwardly under the influence of spring 418 and connects the pressure port 244 with the pitch increase port 404 of the blade angle distributor valve 246. The selector valve 434 in the adjusted position connects the control port 404 directly with the pitch increase chamber 274 thru 452 and the control passage 270. The blade 26, unless its pitch increasing movement is arrested or interrupted, now assumes a feathered position. In either instance, as the blade 26 moves toward the blade angle selected the feed back thru pinion 536 and shaft 538 actuates the yoke 540 to swing the floating lever 422 about the yoke 520 which is now operating as a pivot point. Consequently the lever 414 of the blade angle distributor valve is moved in a reverse direction until it comes to a point where the control ports 404 or 406 are again covered. Under those conditions there will be no further movement of the blade 26. However, each and every blade shifting movement experienced by the blade 26 of the inboard propeller element is communicated to the blade angle servo distributor valve 2460 of the outboard propeller element, thru the agency of the pinion 530, the screw shaft 532, and the control ring 534 which swings the floating lever 4220 about the yoke 5220 to adjust the plunger 4120 of the blade angle distributor valve 2460 in the outboard propeller element. The corresponding control ports 4040 and 4060 are connected with the pressure supply port 2440 so that one of the chambers 2720 and 2740 of the outboard blade angle servo 2760 is operated for shifting the blade 22 in like amount and character. As the blade 22 of the outboard propeller element moves toward the selected position the feed back thru pinion 526 and shaft 524 actuates the yoke 5220 to swing the floating lever 4220 in a reverse direction, the yoke 5200 now operating as a pivot point so that the plunger 4120 takes up a position to cover the control ports 4040 and 4060. Thus, the blades 22 of the outboard propeller element follow the pitch change movement of the blades 26 in the inboard propeller element, whether those blades are under control of the governor valves or the blade angle control valve.

The system pumps 220 and 2200 along with the auxiliary pumps 222 and 2220 are normally capable of supplying fluid flow under pressure to satisfy the power demands for shifting the blades during any of the governing operations, and the usual changes under blade angle valve control, while the respective propeller element is rotating. In engine-propeller combinations where the power element is a turbine, it is necessary to be able to change the blade pitch to any desired angle and maintain that angle until it is selectively changed. Those additional blade angle changes may take place while the propeller is not rotating and include a blade angle change to feathering condition, moving the blades back to the governed pitch range, as well as shifting the blades from a governing range to a negative or reversed pitch range and then returning the blades to the governing range. The change to these several ranges of blade angles or regimes of operation must be available at the call of the pilot, and the blade angle or range selected must be maintained until some selected change is made by the pilot. The selective actuation is attained thru movement of the regulator control 38 which sets the blade angle distributor valve 246 of the inboard propeller element, and under certain conditions a coordinated control of the fuel governor of the turbine. Figs. 4 to 7 should be referred to.

If the propeller and turbine are rotating when one of these selected blade angle changes is called for the fuel control element 48 of Fig. 2 will adjust the speed of the power plant in a direction to prevent overspeeding of the turbine if the selected blade angle change is likely to set up a momentary low torque demand. The regulator control arm 38 sets the blade angle distributor valve 246 in the proper position for direction of fluid pressure to the blade angle servo 276 for accomplishing the selected blade angle. If movement of the control element 38 selects an angle outside of the governing range the cam plate 556 of Fig. 7 will be actuated to shift the control valve 250 in position for operating the selector valve 434 which will bypass all controlling effects of the solenoid actuated valve 172 by closing switch 82 thereby enabling relay 78 to open the cut out switch 70, and the underspeed governor 242, and the overspeed governor 238 by blocking ports 440 and 442. In particular, when the control element 38 is actuated by pilot control lever 46 so as to select a blade angle outside of the governing range, the switch 82 will be closed by the mechanical linkage 46a, as depicted in Fig. 6. Thus, whenever the pilot chooses to manually control blade angle, the switch 82 will be closed thereby inactivating the solenoid valve 172 by disconnecting the pulsing unit 68 through the opening of switch 70. In consequence, the ports 404 and 406 of the blade angle distributor valve 246 will have wide open connection with the chambers 272 and 274 of the blade angle servo. Under those conditions the pumps 220 and 222 will supply the necessary flow of fluid so long as the propeller is rotating.

If the blade angle change selected is one that will effect the reduction in propeller speed to some selected value, say 250 to 300 propeller R. P. M., the reaction of centrifugally actuated switch 202 is to shift the connection of electric leads 128 and 130 from a circuit connection to the solenoid valve 172, to a circuit connection with the windings of the motor 487 driving the feathering pump 494. That deenergizes the windings 168 and 170 of the solenoid actuated valve 172 which then becomes centered so that the valve lands 256, 258 cover the control ports 260, 262 and prevent any flow from the pressure supply port 226. Tho there might be alternating and pulsing signals from the governor-synchronizer 54 impressed upon the conductors 94 and 96 leading to the switch 202 that electric energy would not operate the feathering motor 487. The feathering pump motor 487 may be operated when the change-over switch 72 is actuated to shift the leads 94 and 96 from connection with the electronic governor leads 90 and 92 to connection with the conductors 98 and 100 in cable 88. The conductors 98 and 100, along with 112 supply a current source to the motor 487 in the nature of 208 volt, 3 phase, 400 cycle power supply. Shift of the leads 94 and 96 from the electronic governor circuit to the feathering motor energizing circuit 88 is effected thru selective operation of the switch 84, which is generally indicative of one or more manually operable switches in the pilot's compartment and the engineer's compartment that may be actuated when it is desired to feather the blades, unfeather the blades, to return them to the governing range, or to shift the blades to negative or reverse pitch and to return to the governed pitch range.

The automatic operation of the switch 202 in changing over from the governing circuit to the blade feathering circuit does not in itself effect feathering, but on the other hand only conditions the apparatus so that feathering of the blades may be accomplished if the control switch 84 is closed. Since the switch 202 connects to the feathering motor only at a low R. P. M., and at an R. P. M. that is far outside of the governing range of propeller operation, the danger of calling for feathering of the blades during high speed operation of the propeller is eliminated. Whether closing of the switch 84 will effect feathering or reverse pitch shift depends upon the position of the regulator control 38 and its manipulation of the blade angle distributor valve 246. The feather pitch of the blades is effected by moving the regulator control 38 to one extreme of its range of movement, while negative or reverse pitch or thrust is accomplished by moving the regulator control 38 to the opposite end of its range of movement.

Thus, if the regulator control 38 is moved to the extreme end of the range for increased pitch the floating lever 422 of Figs. 4 and 7 will be moved generally counterclockwise about the yoke 540. That allows lever 414 of the blade angle distributor valve 246 to raise the valve plunger 412 and establish a wide open fluid connection between the pressure supply port 244 and the pitch increase port 404. The extreme movement of the regulator control 38 also shifts the cam plate 556 for the control valve 250 and establishes the connection between pressure port 248 and passage 470 leading to the chamber 468 of the selector valve 434. The fluid circuit connections are thereby established between the pitch increase chamber 274 of the blade angle servo motor and the pressure supply line which are suitable for shifting the blades to the feathered position.

All of the governing control elements are now by-passed or rendered noneffective such that there will be no interference with the blade angle control selected by movement of the regulator control 38. If the propeller is rotating, the pumps 220 and 222 will feed into the pressure line and thru the ports 244 and 404 of the blade angle distributor valve to the pitch increase chamber 274 which shifts the blades 26 toward the feathered position. Continued rotation of the propeller will continue to drive the pumps 220 and 222 which soon accomplish the feathered inclination of the propeller blades. The blades react on pinion 536 and shaft 538 to move the yoke 540 in a corrective measure to swing the floating lever 422 which now raises the cam 420 of the lever 414 and brings the plunger 412 back to a covering relation of the pitch increase port 404. While the pressure fluid from the pumps 220 and 222 has been flowing into the pitch increase chamber 374 of the blade angle servo-motor, the fluid in the decrease pitch chamber 272 has been draining out thru the passages 268, 454 and 424 to the drain line 370 from which it flows into the sump 480 and thence thru the motor casing 486 to the reservoir within the regulator 30.

In the event that the last end of the shift of blades to the feathered pitch position is too slow to satisfactorily meet the demands, or if it is desired to hasten the complete shift to the feathered blade setting; the manual switch 84 may be closed which will complete the electric circuit to the feathering pump motor 487 if the switch 202 has shifted from the electronic governor circuit to the feathering motor circuit. When the motor driven feathering pump 494 is operated it withdraws hydraulic fluid from the sump 480 and forces it thru passage 498 into the high pressure line 224 thru the check valve 230 and branch 228; if the pressure within the lines 224 and 228 is below the setting of the flow control valve 232. That valve is usually set so that pressures existing in lines 228 when great enough (about 500 pounds p. s. i.) will effect by-pass of the output of the pump thru 500 and 512 for return to the reservoir within the regulator.

If the feathered pitch relation is selected while the propeller is at a standstill or not rotating, the regulator control 38 will be moved to the same position as for feathering with a rotating propeller, which will establish proper fluid connections between the pitch increase chamber 274 of the blade angle servo-motor and the pressure supply line. Now, however, there being no energy in the pressure supply line from the pumps 220 and 222, there will be no effort applied to changing the pitch of the blade 26. Since the propeller is not rotating the centrifugal switch 202 will be in position for connecting the windings of the feathering motor 487 with the conductors 94, 96 and 112. Now, if the manual switch 84 is closed the switch 72 will be operated to shift the connection for leads 94 and 96 from the electronic governing leads 90, 92 to the power supply lines 98 and 100, which along with the lead 112 of the cable 88 provide the three-phase power supply to the windings of the feathering motor thru the slip rings 102, 104 and 106, and the brushes 118, 120, 122 feed the energy to the winding of the motor in proper sequence over conductors 144, 146 and 156.

The output of the pump 494 feeds thru the high pressure line and the ports of the blade angle distributor valve to fill the chamber 274 of the blade angle servo motor, with the drain from the chamber 272 always feeding back to the sump 480 so that a supply of fluid is always available for the intake of the pump 494. The motor housing 486 and scroll 490 with drain relief valve 492 provide a ready supply of fluid for the start of the pump regardless of its position in the rotating regulator, and until the drain from the blade angle servo motor replenishes the sump 480 to further supply the pump. The drain from the servo-motor also provides means for cooling the motor windings by the excess of fluid that may flow from the sump 480. When the propeller is not rotating, continued actuation of the motor driven feathering pump 494 is capable of shifting the blade pitch to any angle desired, whether it be an angle within the governing range, to the full feathering position, or to some point between the governing range and the full feathering position. Depending upon the position of the regulator control member 38 the motor driven feathering pump may be used to accomplish a blade shift to any desired angle setting whether the change of blade pitch be in an increasing pitch direction or in decreasing pitch direction. Whether the shift of the blades is to an increase pitch position or to a decrease pitch position, is determined by the setting of the regulator control arm 38.

Should the manual control switch 84 be closed after the blade 26 has reached either extreme of movement, that is the feather position at one end of the pitch range, or maximum negative setting at the opposite end of the pitch range, the pump 494 will continue to operate and feed the fluid under pressure thru the passage 498 and thru check valve 230 and branch 228 to the high pressure line 224. As soon as the pressure in 228 builds up to the setting of the flow control valve 232, the plunger 504 moves upward to connect the branch 500 with exhaust port 512 which unloads the system and prevents damage to any of the control elements.

When it is desired to unfeather the regulator control 38 is moved out of the feathered position to some point in the governed pitch range, or at least to a decrease pitch position. Either of two conditions obtain. If moved to a decrease pitch position, outside the governor range, it so sets the valve plunger 412 of the blade angle distributor valve 246 that the decreased pitch port 406 will be connected with the pressure supply port 244. The control valve 250 for the selector valve 434 will still be in position to connect the pressure line 234 with the actuating chamber 468 of the selector valve, so that as soon as the feathering pump feeds into the pressure line 224 the valve piston 456 will be actuated to connect passage 454 with passage 268 leading to the decrease pitch chamber 272 of the blade angle servo. If the shift of the regulator control 38 is to a point within the governing range then the control valve 250 will be actuated by the cam 556 to vent the chamber 468 of the selector valve which permits the plunger 456 to raise and disconnect the blade angle distributor valve 246.

However, the decrease pitch control passage 268 is connected with passage 444 which leads to the decrease pitch ports 348 and 374 of the overspeed governor 238 and the underspeed governor 252 respectively. At the start of unfeathering the propeller is not rotating and there will be no centrifugal force applied to the valve plungers 354 and 382 of either the overspeed governor 238 or the underspeed governor 242. The valve plunger 382 of the underspeed governor 242 is therefore depressed by the spring 388 so that pressure supply port 240 is then connected with the decreased pitch port 374. Under those conditions operation of the motor driven pump 494 will develop pressure in the line 228, 224 and 234 which penetrates to the pressure supply port 240 and thence thru decrease pitch port 374 and by passages 444 and 268 to the decrease pitch chamber 272. On the other hand if the movement of the regulator control 38 has been to a point of decrease pitch that is not within the governing range, the delivery of pressure by the pump 494 to the line 234 will penetrate to the port 244 of the blade angle distributor valve, and thence by port 406, passages 454 and 268 to the decrease pitch chamber 272. The blades in either instance are thereby rotated in a pitch decreasing sense until the assumed blade angle setting is reached.

If the unfeathering shift is called for while the craft bearing the propeller is in motion thru the air, the change of blade angle will progress to a point where windmilling of the propeller will take place. As soon as the propeller rotates, the pumps 220, 222 will be actuated and add to the pressure line 224. Eventually the propeller will windmill at a speed above the setting of the centrifugal switch 202 whereupon that switch will disconnect the feathering pump motor and reestablish the electric connection between the solenoid actuated valve 172 and the electronic governing control supplied over the conductors 90, 92.

Within the scope of movement of the regulator control 38 for selecting and maintaining any blade angle outside of the governing range, is the selection of a negative thrust action of the propeller, always controllable by the pilot. Selection of a negative thrust condition of propeller operation is accomplished by actuating the regulator control arm 38 of Fig. 7 in the decrease pitch direction so as to swing the floating lever 422 of the blade angle distributor valve about the yoke 540. Downward movement of the valve plunger 412 follows and connects pressure port 244 with the decrease pitch port 406. Movement of the regulator arm 38 also actuates the cam plate 556 which moves the control valve 474 upward to connect ports 248 and 472 so that fluid under pressure in the line will shift the selector valve for connecting the control ports 404, 406 of the blade angle distributor valve with the control passages 268, 270 leading to the blade angle servo-motor.

If the negative thrust selection is made while the propeller is rotating, the pumps 220 and 222 will adequately supply the high pressure line 224, 234 and fluid will flow thru ports 244 and 406 of the blade angle distributor valve, and the passages 454 and 268 to the decrease pitch chamber 272 to effect the corresponding negative blade angle setting. The presence of high pressure in the passages 234 and 470 will have shifted the selector valve plunger for connecting passages 454 with 268 as has been explained. Should the propeller be nonrotating at the time the negative thrust angle is selected, there will be no pressure potential in the high pressure line, and hence the selector valve plunger 456 will be in the governing position even tho the control valve 250 has been shifted to connect 248 and 472. Since the propeller is not rotating, the centrifugally operated switching valve 202 will be in a position to connect the windings of the feather pump motor 487 with the conductors 94, 96 and 112. If the manual switch 84 is now closed, then the switch 72 will be actuated to shift the connection of the feathering motor from the electronic governing circuit over conductors 90, 92 to the pump energizing circuit including the conductors 98, 100 and 112.

The motor driven feathering pump 494 will then build up pressure in the high pressure line 224 which will shift the plunger 456 of the selector valve 434 so as to connect passages 454 and 268 for fluid flow from pressure port 244 and 406 of the blade angle distributor valve to the decrease pitch chamber 272 of the blade angle servomotor. The fluid medium within the increase pitch chamber 274 will drain out thru 270 and 452 to return by passage 370 to the sump 480 of the feathering pump 484. The blade 26 moves toward the selected negative pitch position and the pinions 530 and 536 rotate along with their screw shafts 532 and 538 respectively. As illustrated in Fig. 7 the screw shaft 532 transmits the pitch shift movement of blades 26 to yoke 5200 and swings the floating lever 4220 in the proper direction to adjust the valve plunger 4120 of the blade angle distributor valve 4160 in the outboard propeller element. The blades 22 thereof are then shifted in the same direction and to a like amount as is the blade 26 of the inboard propeller element. The pinion 536 and screw shaft 538 operate to move the yoke 540 in a direction to readjust the valve plunger 412 of the blade angle distributor valve 246 in the inboard propeller element.

In like manner the shift of the blades in the outboard propeller element operates thru the pinion 526 and screw shaft 524 to move the yoke 522 for restoration of the valve plunger 4120 to its equilibrium position. In this manner all of the blades 22 and 26 are adjusted to the selected position thru the manual adjustment of the regulator control arm 38 whether the propeller mechanism is in rotation, or is at rest. That is made possible by means of the centrifugally operated selecting switch that disconnects the electronic governing circuit when the propeller rotation decreases to such a point that a governing control is no longer feasible. The propeller control thereupon assumes direct connections by which an outside electrical source and control may be applied for the operation of an auxiliary and manually controlled electrically driven pump. That pump supplies fluid under pressure in case the fluid pressure developed incident to propeller rotation is not sufficient to accomplish the selected shift called for.

Of the three electrical items on the propeller that require electrical supply for their operation, the electronic governing system feeding thru the slip rings 102 and 104 is used only when the propeller is operating within the governing range. The power for the electric feathering motor, as controlled by the centrifugally actuated switch 202 is applied only when the propeller is operating at a rate below some predetermined low speed, for instance, less than about 300 R. P. M. which is far below the governing range. The power for the electric feathering motor can therefore be provided by using slip rings 102, 104 and 106. The third item of electrical supply is that for the icing control of the propeller blades, which is supplied over the cable 76 and thru brushes 106, 108, and 110. This current supply may be a 200 volt three-phase current at 400 C. P. S., which is distributed as shown in Fig. 6 by brushes 122, 124 and 126 engaging slip rings 106, 108 and 110 connected to slip-rings 162, 188 and 190, there being branches 176, 178 and 180 connecting with the ends or terminals 182, 184, 186 of the blade heating elements.

The slip rings 158, 160, 162 and 188 and 190 all rotate with the inboard propeller element and are engaged by brushes 192, 194, 196, 198 and 200 carried by the outboard propeller element. Brushes 196, 198 and 200 connect to terminal points 1820, 1840 and 1860 for the heating element of the blades in the outboard propeller element, and connect those elements in parallel with the like elements on the inboard propeller element. The brushes 192, 194 and 196 of the outboard propeller element connect with the terminal points 1500, 1480, and 1520 of the windings for the feathering pump motor 4870 of the outboard propeller element, and by the brush engagement with slip rings 158, 160 and 162 connect those motor windings in parallel with windings for the feathering pump motor 487 of the inboard propeller element. Thus, when blade heating current is applied over the cable 76 for the control of ice conditions on the inboard propeller element, it is also conducted to the blade heating elements of the outboard propeller element, and any cycling unit that operates to cycle the current over the cable 76 for one propeller element will be equally effective for the other propeller element. Similarly, when the centrifugally actuated switch 202 is in circuit connection with the feathering pump motor for the inboard propeller element it will also be connected with the feathering pump motor of the outboard element. It is obvious of course when the centrifugal switch 202 is in circuit connecting position for energizing the solenoid valve 172, that there is no corresponding valve or connection to the outboard propeller element.

All of the features of this invention described and schematically illustrated in Figs. 1 to 7 inclusive, have physical embodiment in the structural views of the drawings numbered as Figs. 8 to 25 inclusive. In the foregoing description in connection with the schematic views 1 to 7, reference characters ending in even numbered digits have been used, and are also used to indicate identical or corresponding parts in the structural views 8 to 25 inclusive, so far as applicable. Additional description of structural embodiment refers in general to parts and elements by means of reference characters ending in odd numbered digits.

Figure 8:
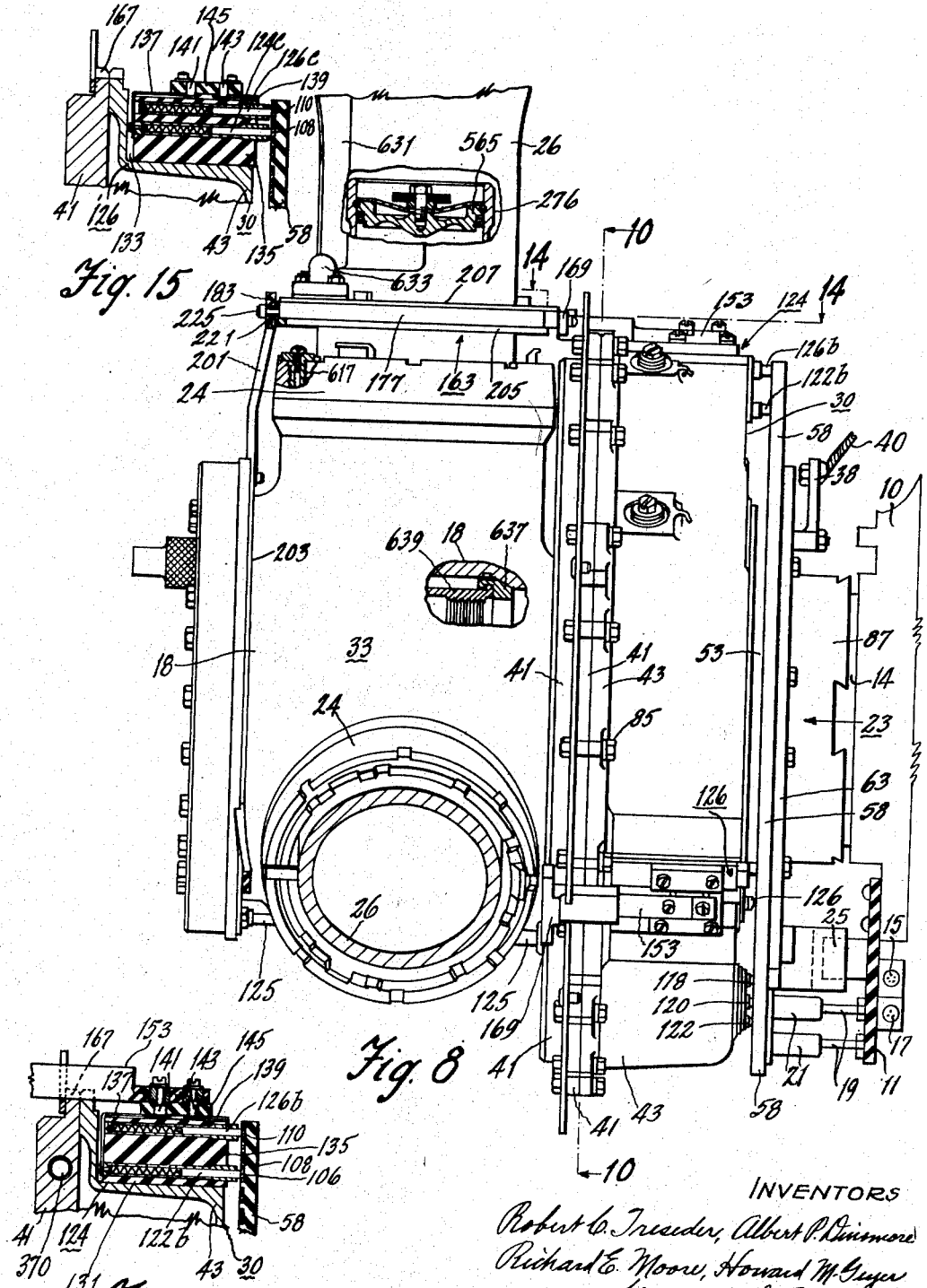
Fig. 8 is an elevational view of the inboard propeller element with certain portions shown in section.

Referring first to Figs. 8, 9 and 12, a terminal board 11 is mounted on the lower part of the gear casing 10 and provides multi-terminal receptacles 15 and 17 for receiving electric plugs carrying all of the electric leads of the propeller mechanism, including the wires of the cable 56. Affixed to the terminal board 11 there are plug members 19 that cooperate with receptacles 21 secured to the slip-ring assembly 58 carried by an adapter assembly 23 surrounding the propeller shaft 14 and restrained against rotation with the propeller by lug and notch relation at 25. There are a plurality of sockets 21, there being one for each of the slip rings 102 to 110 inclusive. Other receptacles 27 provide brushes 29 for transfer of electrical energy to desired accessories, or for establishing a ground connection.

Preliminary to tracing the electrical circuits through the counter-rotating propeller unit it should be recalled that each counter-rotating unit comprises an outboard propeller element 31 including the hub 16 mounted on and driven by the propeller shaft 12 in one direction, and an inboard propeller element 33 including the hub 18 mounted on and driven by the propeller shaft 14 in the other direction. Each propeller element is complete and self-sufficient in its own construction so far as to include a hub driven by a shaft for revolving a set of pitch shiftable blades in response to the control through a self engendered fluid pressure system acting upon intelligence transmitted to the inboard propeller element 33 by the adapter assembly 23, and from the inboard propeller element 33 to the outboard propeller element 31 by the inter-propeller control means 32 indicated in Fig. 22. Both propeller elements 31 and 33 are of the same general construction and appearance as shown in Fig. 8 which is specific for the inboard propeller element. Differences of structure between the two propeller elements will appear as the description progresses. The intelligence transmitted by the adapter assembly 23 comprehends the mechanical actuation of the regulator control lever 38 by the levers 46 and linkage 49 indicated in Fig. 2, as well as the electrical actuation of the solenoid valve 172, the feathering pump 494 and the icing control applied through the slip-ring assembly 58 by means of the electric leads in the cable 56.

Referring to Figs. 2, and 8 to 15, the inboard propeller element 33 that receives the control intelligence from the adapter assembly 23 includes the hub 18 that provides a plurality of sockets 24 and extends rearwardly in a tubular sleeve 35 by which it is drivingly mounted on the propeller shaft 14 by means of splines 37. The sleeve 35 joins the hub body 18 at a square shoulder 39 that provides a seat for the regulator 30 that is thereby supported and rotated by the rotating propeller. The regulator 30 includes an annular regulator plate 41 seating on the tubular extension 35 and against the shoulder 39 to support a regulator cover 43 cooperating with the adapter assembly 23 to provide an annular chamber 45 acting as a reservoir to contain the fluid medium, and to house all of the fluid pressure developing means and control apparatus by which the shift of blade pitch is effected.

The adapter assembly 23 includes a sleeve 47 extending axially across the reservoir 45 to engage the fluid seal 49 provided at the inner periphery of the regulator plate 41, and also to engage a seal 51 carried by a depending flange of the cover 43. A thickened portion 53 of the adapter sleeve 47 has a ball bearing support 55 at the inner periphery of the cover 43 and extends radially with a tooth flange 57. The thickened portion 53 extends axially rearward of the cover 43 and supports for oscillation an internal ring gear 59 to which is affixed regulator control arm 38. A spacer 61 is disposed between the thickened portion 53 of the sleeve 47 and a mounting ring 63 thru which cap screws 65 are threaded into the thickened portion 53 to provide support for the internal ring gear 59 and the slip ring assembly 58. The internal ring gear 59 meshes with pinions 550 for rotation of the screw shaft 552 by which the control ring 548 is caused to move axially of the adapter assembly. Here, the control ring 548 circumscribes the sleeve 47 and is guided for only lineal movement along the same, and in doing so, due to connection with the yokes 520 and 556 transmits a mechanical movement of hand levers 46 to the speed setting and selecting means.

Figure 11:
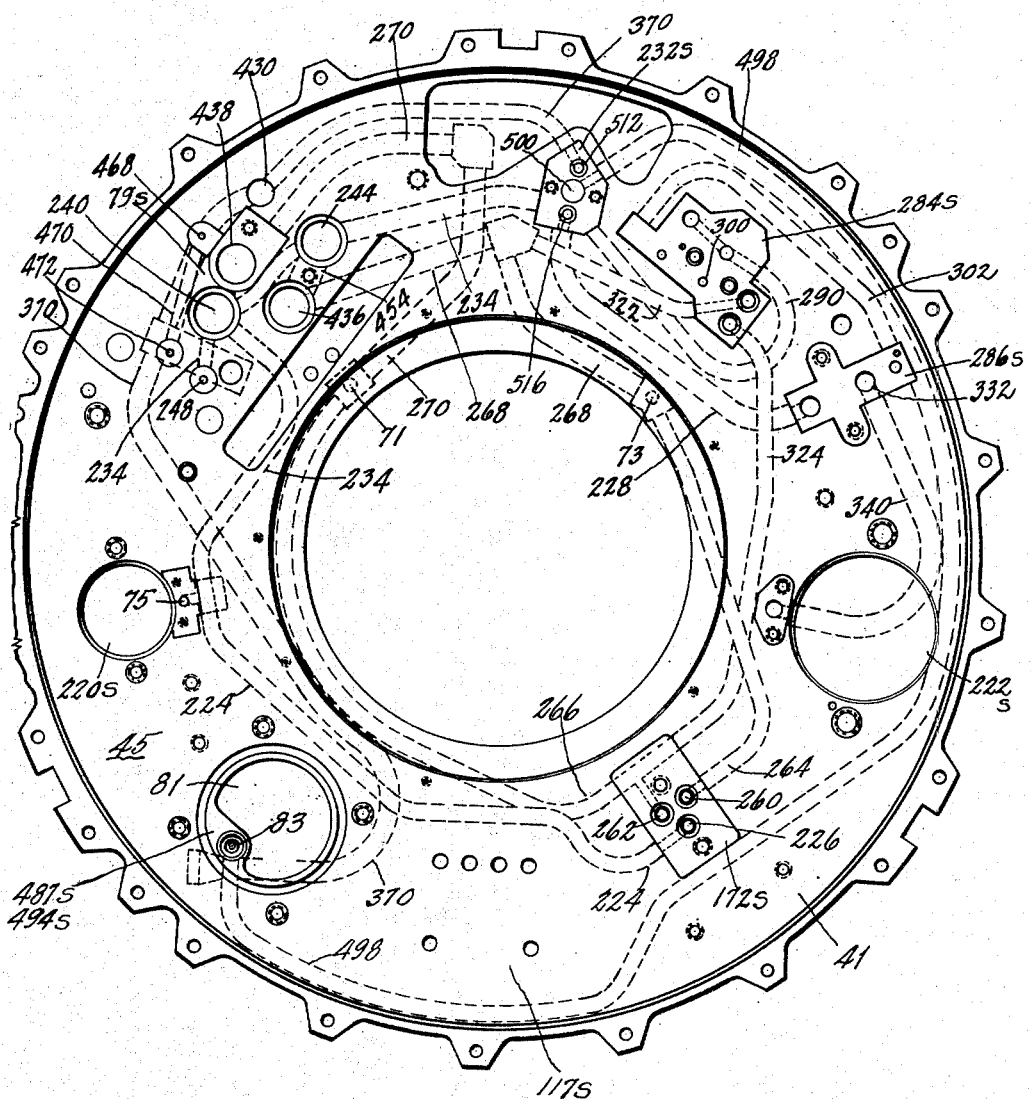
Fig. 11 is an elevational view of the regulator supporting plate with all the control elements removed and with the fluid circuit connections shown in dotted line for accomplishing the fluid circuit connection illustrated in Fig. 4.

Figs. 9 to 15 illustrate the relation of parts by which the hydraulic regulator 30 has its physical embodiment. The regulator plate 41 is a principal supporting plate for the regulator mechanism and has embedded within itself a system of interconnected rigid pipes and passages forming the plumbing system by which the pumps, pressure regulators and pressure distributing means are connected to perform the functions described in connection with Fig. 4. These control elements include as shown in Fig. 10 the pumps 220, 222 which have driving pinions 67 and 69 that mesh with the tooth flange 57 of the adapter assembly so that they may be driven as they revolve about the adapter assembly when the propeller is rotating. With reference to Fig. 11 these pumps 220 and 222 are mounted over the wells 220s and 222s and in such manner that they are connected into the fluid circuit as suggested by the dash lines.

In Fig. 11 the tubage effecting the same functional connections shown in Fig. 4 have been indicated by the same reference characters. Some of the passage connections shown and indicated in Fig. 4 can not be found on Fig. 11, and some of them appear to be connected in a different relation. That is because various elements of fluid pressure control mounted upon the regulator plate shown in Fig. 11 and disposed in accordance with Fig. 10 have been physically combined and incorporate interior connections that accomplish the identical control proposed by Fig. 4.

Thus, comparing Figs. 10 and 11, the solenoid actuated valve 172 is mounted on pad 172s so as to connect with ports indicated at 226, 260 and 262. The port 262 opens to passage 266 that leads to an increased pitch port 71 while the port 260 opens to passage 264 that leads to decreased pitch port 73. Port 226 opens to passage 224 connecting with port 75 the outlet of pump 220, and joins passage 234 supplying pressure to other ports. At 286s is mounted the flow control valve 286 which also incorporates check valve 344 for automatic connection of pump 222 thru 340 into the line 228, when the pressure in passage 302 falls to a proper value. At the station 284s is mounted the three element pressure control valve 284 which incorporates the shuttle valve 318, the pressure control valve 294 and the relief valve 310. In this case the increase pitch pressure is applied to one side of the valve 318 by the passage 266 and 324, while the decrease pitch pressure from port 73 is applied to the other side of the valve thru passages 268 and 322. At the station 232s there is mounted the feather pump control valve 232 which also incorporates the check valve 230 that opens into the high pressure line 234.

At the station generally indicated by 77 there is mounted a governor valve assembly as indicated by 79 in Fig. 10 that incorporates, reading in a clockwise fashion, a selector valve servo 250, the underspeed governor valve 242, the overspeed governor valve 238, the selector valve 434 and the beta distributor valve 246. The servo selector valve 250 opens to the ports 472 and 248, while the remaining valves of this unit or assembly 79 have internal connections properly cooperating with the large ports indicated at 240, 436, 438 and 244 which in main provide a master increased pitch port 438 and a master decreased pitch port 436 connected by passage 268 with the decrease pitch port 73, and by the passage 270 with the increase pitch port 71. The drain from the control valves is emptied into passage 370 by which it flows to the well 81 of the regulator plate and over which is mounted the electric driven feathering pump 494 and motor 487, that pump having an output into the port 83 connecting with the passage 498 leading to the feather pump control valve 232.

All the control mechanism as shown in Fig. 10 and connected as indicated in Fig. 11 is enclosed in a reservoir 45 effected by proper union by means of screw devices 85 to join the regulator plate 41 and the cover 43 whose inner periphery is closed by the adapter sleeve 47. The regulator is built up to that extent whereupon it is passed over the rear tubular extension 35 of a hub and seated against the shoulder 39. A tubular nut 87 threads upon the end of the extension 35 at 89, and forces the regulator plate 41 against the hub shoulder 39 where it makes proper hydraulic connection between the increased pitch port 71 and the decreased pitch port 79 of the regulator with appropriate passages leading to the blade acting servos 276. With reference to the lower portion of Fig. 9 the increase pitch passage 268 connects with passage 91 in the hub casting 18 that leads to an internal annular groove 93. A short drillway 95 opens from the groove 93 into the increased pitch chamber 274 of the blade actuating servo. A second internal annular groove 97 is connected by a rigid tube 99 to the decrease pitch chamber 272 of the blade actuating servo. The groove 97 is similarly connected to the decrease pitch port 73 of the regulator, tho not so shown, it being offered that the illustration of how port 71 is connected will suffice. A wide ring 101 is press-fitted into the bore of the hub 18 to close off the open side of the grooves 93 and 97 and to prevent cross leakage.

The specific description of the blade actuating servo 276 will appear later, in connection with Fig. 25. Fluid pressure distributed by any means to the ports 71 and 73, whether that distribution be by the hydraulic governor assembly 79 or by the electronic governor and the solenoid actuated valve 172, will be applied to the grooves 93 and 97, and by those grooves to the chambers 274, 272 of all of the blade actuating servos. As pressure is applied to one chamber return flow or drain is accomplished from the other chambers.

For transmitting blade pitch intelligence to the solenoid actuated valve 172, the regulator cover 43 insulatingly supports a plurality of electrical brushes 118, 120 and 122 adapted to rub against the slip rings 102, 104 and 106. Fig. 12 shows brush 120 in section and comprises a tubular member 103 secured in the regulator cover 43 to house the contact members 105 and 107 which are separated by a spring 109 forcing the contact 105 against the slip ring 104 and the contact 107 against a contact pad 111. The other brushes 118 and 122 are like 120 in structure and operate to connect slip rings 102 and 106 with contact pads 113 and 115 in like manner. The contact pads 111, 113 and 115 are conductive inserts embedded in a flexible insulator 117 physically connecting the feathering pump motor 487, the centrifugal switch 202 and the solenoid actuated valve 172. The insulator 117 is mounted inside of the regulator 30 and supported by the regulator plate 41 while the switch 202 is mounted in a depression or pocket 119 on the outside of the regulator plate 41. Bolts and screws pass through the plate providing the terminal connections, also operate to retain the switch and insulator in position at the station 117s indicated in Fig. 11.

Also embedded within the insulator 117 there are conductive elements 128 joining pad 111 to switch terminal 216, element 130 joining pad 113 with terminal 218, element 156 joining pad 115 with motor winding terminal 152, element 144 joining motor winding terminal 148 with switch terminal 136, element 146 joining motor terminal 150 with switch terminal 138, element 164 joining switch terminal 140 with solenoid terminal 121, and element 166 joining switch terminal 142 with solenoid terminal 123, all of which is schematically illustrated in Fig. 6 of the drawings. The switch 202, it will be recalled from Fig. 6 selects whether the energy available at the contact pads 111, 113 and 115, will be applied to the feathering pump motor 487, or to the solenoid actuated valve 172. A cover 119c secured to the outside of the regulator plate 41 over the pocket 119 encloses the centrifugal switch 202 and provides an opening with a grommet through which a rigid conduit 125 enters to provide a housing for electric leads extending the pump motor circuit from the switch 202 to the appropriate slip rings of the slip ring assembly 74 for the outboard propeller element 31. By that means the common lead 156 connects with slip ring 162, lead 144 from switch terminal 136 connects with slip ring 160 and lead 146 from switch terminal 138 connects with slip ring 158. From these slip rings 158, 160 and 162 of the assembly 74 connections are made to the windings of the feathering pump motor for the outboard propeller element 31 by brushes 192, 194 and 196 mounted in the cover of the outboard regulator in the same manner as accomplished in the inboard propeller element 33. It should not therefore be necessary to specifically describe those connections for the outboard propeller element, more than to point out that in the regulator 28 for the outboard propeller element there is no solenoid actuated valve, and there is no centrifugally operated switch for selecting the motor pump circuit or the governing circuit. All of that selecting is done by the switch 202 of the inboard element and translated to the outboard element by the interpropeller control 32.

The preceding description provides for the transmission of energy over the leads 94, 96 and 112 to the mechanism within the inboard regulator 30, and through it to the mechanism of the outboard regulator 28. For transmission of energy applied to the leads 112, 114 and 116 to the inboard propeller element 33, and through it to the outboard propeller element 31, brush assemblies 122, 124 and 126 are mounted in pockets 129, 131 and 133 of the cover 43 for the inboard regulator 30. These brush assemblies are circumferentially distributed around the regulator, there being one for each blade carried by the hub. Each assembly comprises a non-conducting body 135 substantially filling the respective pocket within which it is secured, and carries two circuit completing assemblies corresponding to two of the three brushes engaging slip rings 106, 108 and 110. A conductive strap 137, 139 connects each circuit completing assembly with a terminal 141 or 143 of a terminal board 145 mounted on the outer face of the body 135. Each circuit completing assembly includes a tubular member 147 housing a movable plunger 149 urged by a spring 151 toward engagement with its respective slip ring on the assembly 58. Each tubular member is connected at one end or the other with one of the straps 137 or 139. As shown in Fig. 13, the plunger for brush 122a connects slip ring 106 with strap 137 which connects with terminal 141, and the plunger for brush 124a connects slip ring 108 with strap 139 that leads to terminal 143. In Fig. 14 brush 122b connects slip ring 106 with strap 137 and terminal 141, and brush 126b connects slip ring 110 with strap 139 and terminal 143. Fig. 15 shows brush assembly 126 as having brush 124c connecting slip ring 108 with strap 137 and terminal 141. Brush 126c connects slip ring 110 with strap 139 and terminal 143.

Attached to each brush assembly 122, 124 and 126 there is a connector 153 of insulation embedding conductors 155 and 157 that connect terminals 141 and 143 with pins 159 and 161 of a blade ring assembly 163. The connector 153 is secured to the brush assembly by screw devices 165 that thread into the terminals 141 and 143, as shown in Figs. 14 and 17. The connector then extends through a notch 167 of the regulator plate and cover to end with a head 169 adjacent the shank of the respective blade where it receives screws 171 making connection between the conductors 155, 157 and the pins 159 and 161. In the blade ring assembly 163 each of the pins 159, 161 connect with an arcuate strap 173 or 175 carried by a nonconducting stationary ring 177, the straps each having a leaf-spring brush 179, 181 and ending in a terminal pin 183, 185. The ring 177 is channeled circumferentially at 187 to house the straps and brushes which are secured in the bottom of the channel as shown in Figs. 19 and 20. Closing the channel 187 there is a nonconducting ring 189 providing arcuate contact straps 191, 193, similar to the straps 173, 175 and adapted to be engaged by one of the brushes 179, 181, the straps 191, 193 connecting with upstanding terminals, 195, 197 from which connections are made to the blade heating elements somewhat as indicated in Figs. 6, 17 and 25. The ring 177 with its straps 173, 175 and brushes 179, 181 is a stationary assembly mechanically connecting the connector 153 on the regulator with a wiring harness 199 having arms 201 radiating from a ring 203 secured to the front end of the propeller element 33. The stationary ring 177 is supported within a channel formed by flanged ring 205 and an annular plate 207 disposed around the shank of the blade so as to engage the inboard side of an integral rib 209. The ring elements 205, 207 are held together by screw devices 211 passing through the ring 205 and threading into clips 213 engaging the outboard side of the rib 209, one of the clips 215 engaging within a notch 217 of the rib 209 to provide driving relation between the blade shank and the support rings 205, 207. The nonconducting ring 189 with its straps 191, 193 and terminals 195, 197 are fixed to the ring 207 and so disposed that the terminals 195, 197 pass upwardly through the annular plate 207 within insulator bushings 219. Thereby, whenever the blade is shifted to a different pitch position, there is relative angular movement between the straps 173, 175 of the stationary ring 177 and the straps 191, 193 of the rotatable ring elements 205, 207 which causes the brushes 179, 181 to slide over the straps 191, 193 respectively.

The harness 199 has terminal members 221 and 223 in the end of each arm 201 that contact with the pins 183, 185 by means of screw devices 225. Conductors 227, 229 join terminal members 221, 223 with metal inserts 231, 233 for completion of the icing control current to each of the blades and to the other propeller element. The harness 199 comprises a molded body of flexible rubber embedding the members 221, 223, 227 and 229 in each arm, and the members 231 and 233 in the ring 203. Mounting screws 235 pass through the inserts 231, 233 and thread into a terminal insert 237 embedded in a nonconducting rigid ring 239 secured to the front end of the hub 18 by screw devices 241 through plate 243 and mounting flange 471 of sleeve 245, the screw devices 241 being threaded into the end of the hub. When the propeller elements 31, 33 are installed for operation a connector assembly 247 carried by an adaptor assembly 249 for the propeller element 31 makes connection with the slip ring assembly 74 of the outboard propeller element. For the time being it should be understood that the adapter assembly 249 while rotatable within the regulator 28 of the outboard propeller element, is driven by the inboard propeller element as will presently appear. The adapter assembly 249, including the slip ring assembly 74 is relatively nonrotatable with respect to the inboard hub 18. The connector assembly 247 therefore comprises a structure somewhat like the brushes structures of Fig. 12, in that there is a flanged tube 251 supported by a plate 253 extending from the adapter assembly 249, the tube housing contact plunger 255 engageable with the terminal insert 237, and a contact element 257 adapted to be connected with the appropriate slip ring of the assembly 74. A spring 259 within the tube 251 urges the contact plunger and element into engagement with the terminals. Screw devices 261 secure one end of the connector 247 to the brush assembly and may be the means for joining the element 257 with the proper slip ring. A separate connector assembly 247 will operate to transfer current from each arm 201 of the harness to other rings of the assembly 74. From this point the pick-up of ice-control current for the blades of the outboard propeller element is so similar to that of the inboard element that description thereof would amount to considerable repetition. It should suffice to state with respect to Figs. 6 and 16 to 21, that brush assemblies 263 carried by pockets in the cover 265 of the outboard regulator 28 cooperate with the slip rings 162, 188 and 190 of the assembly 74, to distribute current to the terminals 267, from which connection is made to a blade ring assembly 269 by a connector 271. From the blade ring assembly terminals and leads connect with the blade heating element as above described and according to the schematic view in Fig. 6. By these means, any control intelligence transmitted to the inboard propeller element over or by the cable 56 of Fig. 6, is appropriately transferred to the outboard propeller element, and the latter is made to follow closely the controlled movements of the other though each element is rotating in an opposite direction.

The physical construction of the outboard propeller element shown in Fig. 16 is practically the same as that for the inboard propeller element shown in Figs. 8 to 15 inclusive, except that there are fewer control elements in the regulator, and the assembly is fashioned to mount on a smaller shaft rotating in the opposite direction. The hub 16 provides a sufficient number of sockets 20 to shiftably mount the blades 26, and extends rearwardly from a shoulder 375 with a sleeve 377 adapted for mounting the hydraulic regulator 28. The bore of the sleeve 377 provides a set of splines 379 for driven engagement with the propeller shaft 12. The regulator 28 includes an annular mounting plate 381 seating against the shoulder 375 and surrounding the sleeve 377 where it is maintained by a sleeve nut 383 threaded upon the rearward hub extension 377, at 385. The plate 381 embeds the piping and passages used for connecting the elements of the control mechanism according to the schematic view of Fig. 5, the pitch increase and pitch decrease passages being connected with the control passages 387, 389 and thence to the opposite sides of the blade angle servo 2760 somewhat as shown in Fig. 16. That may include a port 391 opening from the passages 387, 389 and aligned with bore 393 in the body of hub 16, which bores open into a groove 395 provided by a band 399 tightly fitting the axial bore of the hub 16. Radial bores 401 in the hub body open into tubes 403 for passing the fluid flow to the decrease pitch chambers 2720 of the servo, while radial bores 405 connect the increase pitch chambers 2740 with a groove 407 of the band 399.

As with the inboard propeller element 33, the outboard element 31 has its regulator plate 381 joined to a cover 409 by screw devices 411 to provide an annular reservoir 413 whose inner bounds is closed off by the adapter assembly 249 having bearings in the plate at 415 and in the cover at 417. On the plate 381 there are mounted the control elements so as to make proper fluid connection with the embedded pipes and passages, the distributor valve assembly being indicated at 419, and one of the pumps at 2200. For example, the pump 2200 empties into passage 2249, and is driven by gear 421 rolling around a toothed flange 423 of the adapter assembly 249 whenever the propeller is rotating. That part of the adapter assembly 249 within the regulator 28 corresponds closely with that part of the adapter assembly 23 within the regulator 30, insofar as a sleeve portion 425 engaging bearings 415 and 417 bears the toothed flange 423 for driving the pumps, and has a thickened ring portion 427 to which is secured an annular plate 429 supporting the slip ring assembly 74, and a spaced clamp ring 431 which are held together by screw devices 433.

The plate 429 and the clamp ring 431 are sufficiently spaced axially to provide free turning of a flanged sleeve 435 having teeth engaging the pinions 530 on the screw shafts 532 which are journalled for rotation in the toothed flange 423 and threaded into and out of the grooved control ring 534 as earlier explained. The flanged sleeve 435 is rotatable relative to the adapter sleeve 425, 427 from a mid or centered position effected by a flat-wire spring 437 anchored at one end to the annular plate 429 and at the other end to a flange 439 of the sleeve 435, the spring 437 surrounding the sleeve 435. The clamp ring 431 has circumferentially spaced and axially extending hollow fingers 441 that engage between webs 443 extending outwardly from an inner sleeve 445 axially movable within an outer sleeve 447 in turn having a flange 449 with splined engagement 451 with the inside surface of the flanged sleeve 435. That provides for relatively rotary and axial movement between the inner and outer sleeves 445 and 447. For urging both of the sleeves 445, 447 toward the right as shown in Fig. 16 and Fig. 22, the hollow fingers 441 enclose a spring 453 for projecting a telescoping plunger 457 outward so that it presses against a flange 459 surrounding the inner sleeve 445, the flange 459 engaging an inner stop flange 461 carried by the outer sleeve 447. Both of the sleeves 445 and 447 terminate at their rear ends in splines or teeth 463, 465 that have driving engagement with toothed elements 467, 469 at the forward end of the inboard propeller element.

The toothed element 467 is a sleeved extension from the mounting flange 471 of sleeve 245 which is fixed by screws 241 with respect to the hub 18, while the toothed element 469 is a cam ring rotatable relative to the hub 18 in response to blade pitch change for translating the blade movement of the inboard propeller element to the inter propeller control and to feed back mechanism for the blade angle distributor valve. The sleeve 245 being driven by the inboard hub 18 then drives the inner sleeve 445, which by reason of the webs 443 and fingers 441 effect rotation of the adapter assembly 249 in the same direction and at the same speed that the inboard propeller element rotates. The adapter assembly 249 rotates within the outboard regulator 28 on the bearings and seals 415, 417, and carries with it the control ring 534, the flanged sleeve 435, spring 437, brush assembly 74, and the outer sleeve 447 splined to the screw adjusting flanged sleeve 435 and to the cam ring 469.

The cam ring 469 is rotatably supported at the foreward end of the hub 18 and is disposed between the plate 243 and the mounting flange 471 of the sleeve 245. In the flange 471 there are a plurality of bushings 473 each journalling a shaft 475 that provides a pair of pinions 477 and 479. The pinions 477 have gear engagement at 481 with the inside diameter of the cam ring 469, and the pinions 479 mesh with an internal ring gear 483 integral with a master or blade coordinating gear 485. The gear 485 provides an outer race for a series of ball bearings 489 that are supported in an inner race provided by a radial flange 491 of the sleeve 245. This arrangement is such that any rotation of the master gear 485 relative to the hub 18 will rotate the shaft 475 and its pinions 477 and 479 thereby rotating the cam ring 469 relative to the hub 18, and due to its splined connection to the outer sleeve 447 also rotates the flanged sleeve 435 which drives the screw shaft 532 in the outboard propeller regulator.

In addition the cam ring 469 provides a cam groove 493 within which is disposed a roller 495 pivotally supported by a sleeve 497 adjustably carried by a feed back shaft 538 that projects into the reservoir 45 for control of the beta distributor valve and other control elements of the inboard propeller element. This feed-back mechanism is lineally movable within a housing 499 attached to the plate 243, and a confined spring 501 tends to project the shaft 538 thru a bore 503 in the hub 18, there being a fluid seal 505 to prevent loss of lubricant and pressure.

Referring to Fig. 23 the feed back shaft 538 is secured to a sliding block 540 to which is pivoted the floating lever 422 notched at one end to form the yoke mating with a portion of the shoe 546 following the groove of the control ring 548. The other end of the floating lever 422 is connected with a cam member 420 engageable with the valve lever 414, and in shifting in response to a control force applied to the shoe 546 pivots on the member 540 to actuate the blade angle distributor valve lever 414, and at proper instances the lever arms 356 and 384 of the underspeed governor and overspeed governor. The blade angle change that is effected results in the lineal movement of the feed back shaft 538, and that in turn moves the carriage 540 in the corresponding direction with the floating lever 422 now pivoting on 546 and swinging in the proper direction to correct the setting of the blade angle distributor valve.

A blade angle feedback of similar construction is incorporated in the outboard propeller element and operates in a similar manner to translate relative rotary movement of the master gear 526 to lineal movement of the shaft 524 for operation and control of the blade angle distributor valve of the outboard regulator 28. The prime difference in the outboard propeller element is that the master gear 526 has a forward projecting sleeve 507 that is splined to the cam ring 509 which actuates a cam roller 511 for reciprocating the rod 524. In either instance when the blades 22 or 26 change pitch they rotate blade gears 513 and 515 meshing with master gears 526 and 485, which in turn rotate their respective cam rings 509 and 469 to push or pull on the rods 524 and 538 respectively.

The mechanism for rotating the blade gears 513 and 515 for both propeller elements are so much alike that a description of one should suffice for both. With that in mind and with reference to Figs. 9, 10 and 25 the following description will be applied to the blade angle servo motor for the blades 26 of the inboard propeller element 33; it being understood that the description applies equally well to the blade angle servo-motor for the outboard propeller element. The hub 18 provides a boss 517 concentric with the blade socket 24, outwardly extending from which boss there is a circular flange 519, inwardly splined at 521 to engage splines 523 on the outside of a fixed spline tube 525. The tube 525 has an inwardly directed flange 529 engaging the flat surface of a boss 517 where it is maintained rigidly by a clamp nut 531 engaging an off-set washer 533 whose perimeter 535 forceably engages the flange 529. The nut 531 also passes thru a lock plate 537 and threaded into the boss 517. One of several tongues 539 of the lock plate extends upwardly thru a radial slot 541 of the washer 533 to engage a locking notch 543 of the nut 531. The nut 531 rigidly supports a transfer tube 99 and perfects fluid connection between the end of the tube 99 and the control groove 97.

The control groove 93 is connected by the bore 95 in the boss 517 to connect to the increase pitch chamber 274 thru the central opening of the flange 529 and the notches 541. The splines 523 of the tube 525 are helical in formation and match up with spline 545 inside of a skirt 547 extending inwardly from the piston head 278. The piston 278 has a depending stem 549 surrounding the tube 99 and perfecting a sealed relation therewith by means of a seal ring 551 held in place by screw 553. On the exterior of the depending stem 549 there are a plurality of annular grooves 555 within which may be seated a snap ring 557. The snap ring 557 in one or the other of the grooves 555 operates to retain spacers and shims 559 that operate to define the low pitch limit to which the blade servo motor can shift the blade pitch. When the piston 278 is moved to the extreme decrease pitch limit the spacers and shims 559, or their accumulation, will engage the end of the fixed spline member 525 at 561. The low pitch limit therefor can be selected and fixed by means of the accumulated thickness of the spacers and shims 559 that are assembled upon the depending stem 549. In the position shown in Fig. 25 the piston 278 is shown in the maximum blade angle position. There the piston head engages at 563 the rim of a cylinder head 565 secured within the open end of cylinder 276 by a snap-ring 567. The piston head 278 provides a fluid seal ring 569 and the cylinder head 565 provides a seal ring 571 both engaging the interior of the cylinder 276 to prevent fluid leakage from the cylinder and from one pitch changing chamber to the other. The piston head 565 is fixedly retained within the cylinder 276 by a spring device 573 having arms engaging the spring ring 567, and its center receiving a cap screw 575 threaded thru a spacer 577 into a central boss 579 of the cylinder head 565. For purpose of easy assembly the piston head 278 and the skirt 547 are made of two pieces of metal threadedly engageable at 581 where they can be locked by a cross pin as is conventional.

The cylinder 276 has its interior surface splined at 583 to engage exterior splines 585 outside of the skirt 547 of the piston assembly. The splines 583, 585 cooperate with the splines 523 and 545 to effect rotary motion of cylinder 276 incident to any lineal movement of the piston assembly relative to the fixed spline 525 and cylinder 276. As the piston 278 moves inward or outward it will also rotate somewhat depending upon the inclination of the splines 523 and 545. As the piston assembly moves in or out and rotates about the fixed spline 525 the cylinder 276 will also rotate depending upon inclination of the splines 583 and 585. The arrangement of splines is such that the total rotary movement of the cylinder 276 will be the summation of the relative rotation between the cylinder 276 and the skirt 547, and the relative rotation between the fixed spline 525 and the skirt 547.

The inward end of the cylinder 276 has a thickened portion 587 ending in a flange 589 on which is formed the blade gear 515. The flange 589 engages the outer race of an antifriction bearing 591 as a pilot and thrust bearing disposed about the hub boss 517, and a fluid pressure seal 593 is disposed between the thickened portion 587 and the circular flange 519. At the outside of the thickened portion 587 the cylinder 276 is splined at 595 to engage an indexing ring 597 whose exterior is splined at 599 to engage splines 601 on the interior of the blade shank 603. A seal 605 between the elements 587 and 603 is disposed inward of the indexing spline 597, the latter being held against displacement by a snap ring 607. The exterior of the blade shank 603 is threaded to receive a nut 609 acting as an abutment for the inner races 611 of stack bearings 613 whose outer races 615 fit within the bore of the socket 24 to be retained by the conventional nut 617 locked in place by a clip 619 and screw 621, the usual lubricant seal 623 being provided.

In order to assemble the blade actuating servo the servo cylinder 276 with both ends open is inserted in the socket 24 and piloted over the boss 517 so as to engage the bearing 591 and the seal 593. When in proper position the stop ring 625 within the lowered end of the thickened portion 587 is disposed over the end of the circular flange 519. The fixed spline member 525 is then inserted within the circular flange so that its splines 523 engage within the spline 521 of the circular flange and so that the flange 529 bottoms on the surface of the boss 517. A stop flange 629 around the lower end and outside of the splined member 525 is closely spaced over the stop ring 625. The spline bolt 531 fixed with the tube 99 is assembled with the clamp plate 533 and lock plate 537 and then inserted within the spline 525 and threaded into the boss 517 in the hub.

The piston 278 with its attached skirt 547 is then inserted within the open end of the cylinder 276 far enough to engage the spline 283 of the cylinder 276. In so doing a particularly numbered interior spline 585 is entered between two designated splines 583 within the cylinder. The cylinder 276 with its partially engaged skirt 537 is then rotated to an index mark according to some particular schedule and thence the piston 238 is depressed far enough to engage the interior splines 545 with the exterior splines 523 on the outside of the spline 525 according to some prearranged plan. With the piston head 278 inserted far enough, then the cylinder head 565 is inserted within the open end of the cylinder 276 and the snap ring 567 and spring member 573 are assembled. Under those conditions the maximum high blade angle will be fixed by the engagement of the piston head 278 at 563. The low angle limit will be determined by the spacers 559 engaging the end of the splined sleeve 525 at 561. The blade 26 with its anchorage assembly consisting of its nut 609 and the stack bearing 613 with nut 617 disposed on the shank of the blade is inserted within the blade socket 24 so that the splines 601 engage the outer spline 599 of the indexing ring 597. That step in the course of assembly is accomplished by returning the cylinder 276 to an index mark and then inserting the blade in some particular angle setting so as to properly mate up with the indexing ring.

The primary indexing of the blade is accomplished by mating particular ones of the splined teeth inside and outside of the skirt 547 in particular grooves between the splines on the outside of the sleeve 525 and the inside of the cylinder 276. A finer adjustment is accomplished by selecting particular splines and grooves between the inside of the blade shank and the outside of the splined ring 597. Further, rapid replacement of a blade can be accomplished without reindexing by means of piston skirt and splines of the sleeve and cylinder. That is because when the nut 617 is removed the blade 26 and its anchorage assembly may be withdrawn from around the cylinder 276 and replaced with another. In the withdrawal of the blade from its anchorage assembly the blade may be withdrawn from the cylinder 276 since the snap ring 607 retains the index ring 597 engaged by the bottom of the cylinder 276, and the stop flanges 625 and 629 prevent withdrawal of the cylinder 276 when the blade assembly is removed.

Assembly of the blades within the sockets of the two propeller elements is about the last step of assembly in making the propeller elements ready for assembly upon the propeller shafts as shown in Figs. 12 and 22. Each of the propeller elements 31 and 33 will then have the general appearance of the inboard propeller element shown in Fig. 8, where the hub 18 is assembled with regulator 30 and has radiating therefrom the blades 26. At this time or later the blade heating elements 631 with its terminal means 633 may be secured to the blade slip ring 163 for completing electrical connections with the pins 195. The propeller element 33 assembled as suggested in Fig. 8 is then assembled on the inboard propeller shaft 14 by seating the hub extension 35 against a rear cone 635 engaging a shoulder on shaft 14, the hub then engaging splines 37 on the shaft where it is maintained by a foreward cone 637 and a hub-shaft nut 639. The propeller shaft 12 for the outboard propeller element is concentric with the shaft 14 and provides a shoulder 641 against which there is disposed a spacing sleeve 643 abutted by the inner race 645 of a bearing having an outer race 647 providing an inter-propeller bearing 649 at the foreward end of the inboard propeller element. Engaging the foreward end of the race member 645 there is a spacing sleeve 651 proving an abutment for a rear cone 653 on which there is seated the aft portion or sleeved extension 377 of the hub 16 for the outboard propeller element 31. With the rear cone 653 in place, the outboard propeller element according to Figs. 8 and 16 is passed over the end of shaft 12 for engagement with the cone and the driving splines 379 where it is held by an outboard hub-shaft nut and cone of the conventional type, and similar to the nut 639 and cone 637 of the inboard propeller element.

The counter-rotating propeller unit is so designed and constructed that assembly of the propeller elements on their respective shafts requires a minimum of linkage connection and adjustment, at the place of installation, since it is only necessary to mount the inboard propeller element on its shaft and secure it in place by the foreward cone and hub-shaft nut. The outboard propeller element is then mounted on its cone and shaft and secured by its hub-shaft nut. Aside from mechanically connecting the regulator control lever 38 with its control cable 40 all connections for the blade pitch control and icing control are automatically made by properly seating the propeller elements on their rear cones. When the inboard propeller element is seated on its cone, the lug and notch provisions 25 are engaged to restrain the adapter assembly 23 from rotating with the propeller, and the slip rings of the assembly 58 are connected to the outside control for the governor-synchronizer and icing control by the telescoping plugs 19 and receptacles 21. Referring to Figs. 6, 7 and 8, the outside governor control is made through the slip rings 102, 104 and 106, with brushes 118, 120 and 122 as is also the feathering pump control. Referring to Figs. 6, 7, 8 and 17, connection for icing control of the propeller is made through the slip rings 106, 108, 110 and brushes 122, 124 and 126.

When the outboard propeller element is seated on its cone the inter-propeller control means 32 is accomplished by the splined engagement between sleeve elements 445 and 245 at the tooth portions 463 and 467. The sleeve 447 and cam ring 469 have their splined engagement at 465. All of the connector assemblies 247 engage with terminal inserts at 237. Thus referring to Figs. 9, 16, and 22, the pitch shifting movement of the blades 26 is translated by sleeves 445 and 447 for control of the blade angle distributor valve in the outboard propeller element. Referring to Figs. 6, 7, 16 and 17, the feathering pump control is made thru the slip rings 158, 160, 162 and brushes 192, 194 and 196 with connectors 247. Referring to Figs. 6, 7, 16 and 17, the icing control is made thru the connectors 247, slip rings 162, 188 and 190 and brushes 196, 198 and 200. By these means the outboard propeller element responds in its pitch shifting movement to every character and degree of control applied thru the inboard propeller element. Every control function that is applied to the inboard propeller element by the regulator control 38 or the slip ring assembly 58, is translated thru the inter propeller control and connection to the outboard propeller element.

Figure 3:
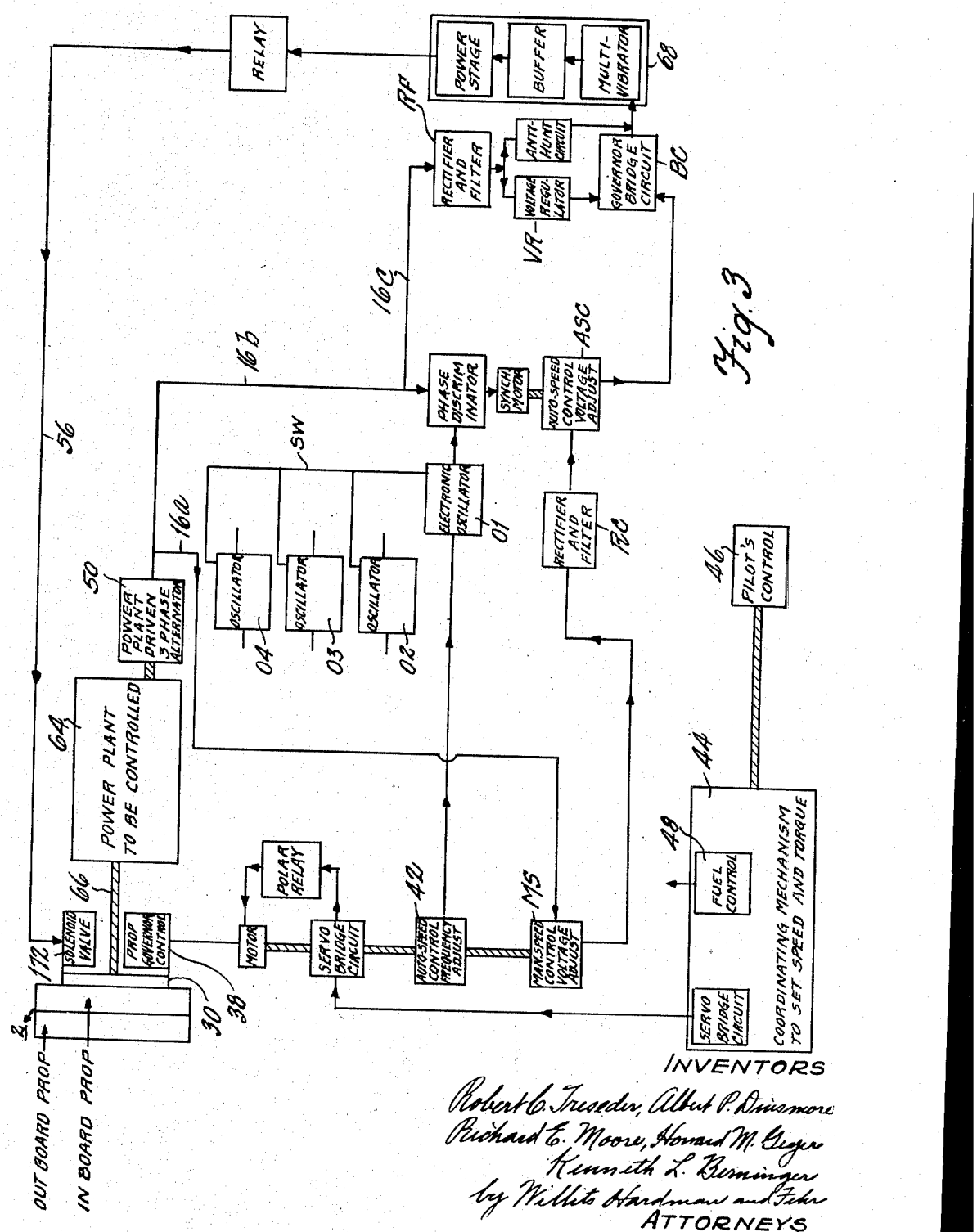
Fig. 3 is a block diagram of one type of control mechanism.

The counter-rotating propeller unit is always under the pilot's control by means of the element 46 as indicated in Fig. 3. This element acting thru the coordinator mechanism 44, a servo-bridge circuit and auto-speed control 42 selects the speed or regime of propeller operation. By motor means, controlled by the pilot's control 46 and acting thru the propeller governor control 38, the regime of constant speed, negative pitch, feathering, or blade angle control is selected thru the mechanical setting of the valve elements in the propeller borne regulator 30, of the inboard propeller. According to the electronic governor-synchronizer preferred, when the propeller is to operate at the constant speed regime a reference speed setting to which governing is to be accomplished is obtained by the auto speed control 42 adjusting an electronic oscillator O1 which sets up a particular frequency of oscillation. The frequency established in the oscillator O1 provides a reference speed controlling the balance factor of the bridge, and the output of the bridge circuit BC controls the output of the pulsing unit 68. The output of the pulsing unit 68 controls the solenoid valve 172 as has been explained, and its control of the hydraulic system within the inboard propeller element operates to adjust the propeller unit in accordance with the setting of the electronic oscillator O1.

Where there are a plurality of engine-propeller combinations they are each fitted with a separate governor-synchronizer apparatus diagrammed by Fig. 3. Connection and inclusion of the other engine-propeller combinations of the installation is indicated in Fig. 3 by additional oscillators O2, O3, and O4, each of which is identically connected to its respective engine-propeller combination. Synchronous operation of a plurality of engine-propeller combinations is accomplished by electrically connecting together all of the oscillators O1, O2, O3 and O4 by conducting means SW joining a common point such that all of the oscillators will be locked-in and will oscillate at an identical frequency. By reference to Figs. 1 and 3, it may be assumed that oscillator O1 would serve the engine-propeller combination 2 while the oscillators O2, O3, and O4 would serve the engine-propeller combinations 4, 6 and 8 respectively. During synchronous operation of the engine-propeller combinations, any one of the combinations may be adjusted and controlled at some other regime without disturbing the synchronous operation of the remaining combinations. In selecting some other regime or speed of operation for any one of the engine-propeller combinations the respective pilot's control 46 is adjusted to effect the control desired. The corresponding oscillator is removed from the lock-in with the other oscillators by being disconnected from the conductor SW, after which it may be adjusted to a different frequency as a reference to which the propeller is controlled. Thus, in accordance with the aforementioned copending application Serial No. 94,984, each oscillator may be manually adjusted to a desired frequency independently of the other oscillators if it is not connected to the conductor SW. However, when the oscillators are interconnected by the conductor SW, all oscillators will operate at the same frequency. In this manner one engine-propeller combination may be controlled to a different governing speed than the other engine-propeller combinations if its oscillator is disconnected from the conductor SW. Moreover, the adjustment of the oscillator disconnected from the conductor SW will not affect the synchronous operation of the remaining engine-propeller combinations which have their oscillators interconnected by the conductor SW. Within these provisions of selective operation, any one or more of the engine propeller combinations may be operated in either the feathering, the negative or the blade angle regime, at any time while the remaining combinations operate at the selected constant speed designated by the reference frequency. That is of great value in surface maneuvering, in case of damaged or erring engine-propeller combination or in conservation of fuel in cruising.

While the embodiment of the present invention as herein disclosed, constitutes a preferred form, it is to be understood that other forms might be adopted.

What is claimed is as follows:

1. In an aircraft, a plurality of engine-propeller combinations, each combination including a turbine driven propeller unit having a controllable pitch outboard element and a counter-rotating controllable pitch inboard propeller element, inter-propeller means operatively interconnecting said propeller elements for translating to the outboard element the pitch changes effected in the inboard element, pitch control means operatively associated with the inboard element providing for constant-speed, feathering, negative and positive blade-angle regimes of propeller unit operation, said control means comprising reversible pitch shifting motors, a source of power for actuating the motors, coarse governing means operable to establish the low speed limits and the high of said constant-speed regime of operation, fine governing means operatively associated with said coarse governing means and operable to maintain any substantially constant speed between the low speed limit and the high speed limit of said constant speed regime of operation, manually operated means operatively connected with said pitch control means for selecting a particular speed within the constant speed regime of operation to be maintained by the fine governing means, and for selecting either the feathering, the negative, or the blade-angle regime of operation in lieu of constant speed operation, a separate source of power for actuating the fine governing means, an additional source of power available for feathering, and means operatively associated with said separate and additional sources of power and operable upon selection of operation in the feathering regime for disconnecting the separate source of power from the fine governing means, and for connecting the additional source of power for feathering, said separate source of power when connected with the said fine governing means operating to control the application of the first mentioned source of power to the said motors for propeller unit peration in the constant speed regime, and said additional source of power when connected for feathering actuating said motors for propeller unit operation in the feathering regime.

2. In an aircraft, a plurality of engine-propeller combinations, each combination including a turbine driven propeller unit having a controllable pitch outboard propeller element and a counter-rotating controllable pitch inboard propeller element, inter-propeller means operatively interconnecting said propeller elements for translating to the outboard element the pitch changes effected in the inboard element, pitch control means operatively associated with the inboard element providing for constant-speed, feathering, negative thrust and blade-angle regimes of propeller unit operation, said control means comprising reversible pitch shifting motors, a source of power for actuating the motors, governing means for controlling the application of power to the shifting motors for propeller operation under constant speed regime, said governing means comprising an overspeed governor and an underspeed governor operable to establish the range of constant speed control, and an additional governor means cooperating with said overspeed and underspeed governors for maintaining any substantially constant speed within said range, manual means operatively connected with said pitch control means for selecting a particular speed within the constant speed regime to which the said additional governor means will control, and for selecting either the feathering, the negative thrust, or the blade-angle control regime of operation in lieu of constant speed operation, an electric feathering pump motor, a source of current for the feathering pump motor including brushes and slip-rings connected between the propeller and the aircraft, a source of current for icing-control of said propeller, and means including at least one of the brushes and slip-rings of the feathering pump motor circuit for conducting the icing control current from the aircraft to the propeller, electrical means for transmitting the control by the additional governor from the aircraft to the propeller for controlling the application of the first mentioned source of power, speed operated selector means disconnecting the additional governing means from said electrical means and connecting the feathering pump motor to its current source, means selectively operable when the speed operated means connects the feathering pump motor with its current source for operating the propeller in either the feathering regime or the negative thrust regime without interfering with the icing control of the propeller, and transmission means including slip-rings and brushes for conducting icing-control current and feathering pump motor current from the inboard propeller element to the outboard propeller element without interfering one with the other.

3. In an aircraft, a plurality of engine-propeller combinations, each combination including a turbine driven propeller unit having a controllable pitch outboard propeller element and a counter-rotating controllable pitch inboard propeller element, inter-propeller means operatively interconnecting said propeller elements for translating to the outboard element the pitch changes effected in the inboard element, pitch control means operatively associated with the inboard element providing for constant-speed, feathering, negative and blade-angle regimes of propeller unit operation, said control means comprising reversible pitch shifting motors, a source of power for actuating the motors, a propeller borne governor operable to establish the limits of the constant speed regime for controlling the application of power to the shifting motors for effecting propeller operating in the constant speed regime, an additional governor responding to speed errors between said limits for controlling to some selected speed setting within the constant speed regime, electric means for conveying the control by the additional governor from the aircraft to an electrically operated device carried by the inboard propeller element including slip-rings and brushes relatively movable during propeller rotation, means in the aircraft establishing the speed setting to which each additional governor will control the respective propeller element, and means interconnecting the speed establishing setting means of each propeller unit for synchronous propeller operation of all counter-rotating propeller units.

4. In an aircraft, a plurality of engine-propeller combinations, each combination including a turbine driven propeller unit having a controllable pitch outboard propeller element and a counter-rotating controllable pitch inboard propeller element, inter-propeller means operatively interconnecting said propeller elements for translating to the outboard element the pitch changes effected in the inboard element, pitch control means operatively associated with the inboard element providing for constant-speed, feathering, negative and blade-angle regimes of propeller unit operation, said control means comprising reversible pitch shifting motors, a source of power for actuating the motors, a propeller borne governor operable to establish the limits of the constant speed regime for controlling the application of power to the shifting motors for effecting propeller operation in the constant speed regime, an additional governor responding to speed errors between said limits for controlling to some selected speed setting within the constant speed regime, electric means for conveying the control by the additional governor from the aircraft to an electrically operated device carried by the inboard propeller element including slip-rings and brushes relatively movable during propeller rotation, means in the aircraft establishing the speed setting to which each additional governor will control the respective propeller element, and means interconnecting the speed establishing setting means of each propeller unit for synchronous propeller operation of all counter-rotating propeller units, and manually actuated means operable upon the speed establishing means of any one of the propeller units for selecting a different speed and regime of operation for that propeller without disturbing the synchronous operation of the remaining propeller units.

5. In a counter-rotating propeller unit for aircraft having pitch shiftable blades and reversible servo-motors for shifting the blades, the combination comprising, a separate source of fluid pressure for each propeller element of the counter-rotating unit, a blade angle distributor valve in each propeller element for controlling the flow of fluid under pressure of that propeller to the respective servo-motors for shifting the blade pitch, a propeller borne governor in one of the propeller elements for controlling the flow of fluid under pressure to the servo-motors for constant speed propeller operation of said one propeller element, a fine control valve connected to the fluid pressure source of said one propeller element for controlling the flow of relatively small amounts of fluid under pressure to the servo-motors during constant speed operation, means outside of both propeller elements for selecting a reference speed to which the propeller unit is to be controlled, an additional governor operatively connected with said fine control valve and responding to errors in speed between the reference speed and the propeller speed, means for applying the additional governor intelligence to the fine control valve for controlling the operation thereof, outside control means operatively associated with said one propeller and operable upon the blade angle distributor valve thereof to select propeller operation either at constant speed regime or at some regime other than constant speed, a pair of relatively rotatable sleeves extending between the propeller elements and responding to pitch shifting movements of the blades in said one propeller element for adjusting the blade angle distributor valve of the other propeller element to effect like pitch shifting movements of the blades in the said other propeller element, and blade angle feed-back means operatively connected with the blades in each propeller element responding to pitch shifting movements of the respective blades for readjusting of the respective blade angle distributor valve.

6. The combination set forth in claim 5, wherein the fine control valve has solenoid means for moving it, and the means for applying the additional governor intelligence includes a pair of electric conductors, sliprings rigidly supported and joining said conductors, and brush means carried by the said one propeller element and electrically connected to said solenoid means.

7. In a counter-rotating propeller for aircraft having pitch shiftable blades and reversible servo-motors for shifting the blades, the combination comprising, a separate source of fluid pressure for each propeller element of the counter-rotating unit, a blade angle distributor valve in each propeller element for controlling the flow of fluid under pressure of that propeller to the respective servo-motors in shifting the blade pitch, a propeller borne governor in one of the propeller elements for controlling the flow of fluid under pressure thereof to the servo-motors to establish the limits of a constant speed regime of propeller operation, a fine control valve connected to the fluid pressure source of said one propeller element for controlling the flow of relatively small amounts of fluid under pressure to the servo-motors during constant speed operation, means outside of both propeller elements for selecting a reference speed to which the propeller unit is to be controlled, an additional governor operatively connected with said fine control valve and responding to errors in speed between the reference speed and the propeller unit speed, outside control means for said one propeller element operable upon the blade angle distributor valve thereof to select propeller operation either at constant speed regime or in the feathering regime, solenoid means operable upon the fine control valve during propeller unit operation in the constant speed regime, electrical conductive means for applying the additional governor intelligence to the solenoid means for controlling the operation of said fine control valve, an electrically operated feathering pump in each propeller element and adapted to supplement the respective source of fluid pressure, and means carried by said propeller and responding to a predetermined speed of propeller operation when the outside control means calls for operation in the feathering regime, for disconnecting the additional governor from said solenoid means and for energizing the electrically operated feathering pump, and mechanical and electrical transfer means between the propeller elements for controlling said other propeller element to constant speed and feathering regimes respectively.

8. The combination set forth in claim 5 wherein the relatively rotatable sleeves include a plurality of screw shafts operable to control the blade angle distributor valve of the said other propeller element, a flanged ring-gear for driving the screw shafts in either direction, a helical spring embracing the sleeve of the ring gear and tending in its unstressed condition to prevent change in said blade angle distributor valve, means including the relatively rotatable sleeves for stressing said spring when the particular blade angle distributor valve is adjusted for control, and means responding to pitch shifting movement in the said other propeller element for restoring the spring to unstressed condition upon the blades of the said other propeller element assuming the setting called for by the said one propeller element.

9. In a counter-rotating propeller unit for aircraft having an outboard propeller element and an inboard propeller element, pitch shiftable blades and servo-motors in each propeller element for shifting the blades thereof, a separate source of fluid pressure in each propeller element, a blade angle control valve in each propeller element for controlling the flow of fluid pressure to the respective servo-motors in the regimes of negative pitch and feathering, a separate adapter assembly with respect to which each propeller element rotates, means in each adapter assembly for adjusting the respective blade angle control valve, an electrically driven feathering pump in each propeller element having an output into the respective source of fluid pressure, an electrical slip-ring assembly carried by each adapter assembly, electrical brushes carried by each propeller element and engageable with the respective slip-ring assembly, propeller borne means in the inboard propeller element for controlling the flow of fluid under pressure to the servo-motors for propeller operation in the regime of constant speed, speed governing means operatively connected with said propeller borne means and having an electrical input through the slip-ring assembly of the inboard propeller element for controlling the elements in the constant speed regime, a source of current and control means having an input through said slip-ring assembly of the inboard propeller element for energizing the feathering motors of the propeller elements, relatively movable mechanical means in the adapter assembly of the outboard propeller element for effecting a like change in the outboard propeller element equal to the character and amount of change effected in the inboard propeller element, means including the slip-ring assembly of the outboard propeller adapter assembly and the brushes of the outboard propeller element for transmitting the electrical energy for the feathering pump from the inboard propeller element to the outboard propeller element.

10. A propeller pitch control system comprising a manually operated control member, means under control thereby for control in a range including a negative pitch range and the low angle portion of a positive pitch range to effect negative thrust regime of operation, for control in the high positive angle range for feathering and unfeathering regime of operation and for selecting speeds in a governing range intermediate low positive angle and high positive angle for constant speed regime of operation, a regulator carried by said propeller and under control by the said member for effecting control of blade angle in the governing range in order to establish the limits of a constant speed regime, said regulator including a source of fluid pressure, an overspeed governor valve connected to the pressure source and an underspeed governor valve connected to the pressure source, and auxiliary electrically operated means operatively associated with said overspeed and underspeed governor valves for obtaining a finer adjustment of blade angle in the governing range, said auxiliary means including a device under control by the said member for selecting the frequency of electrical impulses in accordance with selected speed, a device operatively connected to said propeller and operated in accordance with propeller speed to set up electrical impulses of comparable frequency, apparatus for comparing the frequencies of the devices, and a solenoid valve connection to said pressure source and energized by the comparing apparatus for controlling blade angle resulting in the selected speed.

11. In propeller assemblies driven by a turbine, the combination including a servo-motor for adjusting the pitch of the propeller blades to regulate the speed of the turbine driving the propeller, a source of fluid pressure for operating said servo-motor, a solenoid actuated valve controlling the application of fluid pressure to said servo-motor, electronic means associated with said solenoid valve, said electronic means operating within a predetermined range to detect difference between the turbine speed and a predetermined reference speed, and operating in response to such differences to energize the solenoid valve to vary the pitch of the blades to adjust the turbine to equal the reference speed, an overspeed governor operatively connected with said source of pressure and said servo-motor and operating at a fixed predetermined turbine speed to prevent dangerous overspeed when the turbine is operating above the control range of said electronic means, and means preventing operation of said overspeed governor as an underspeed governor.

12. In propeller assemblies driven by a turbine, the combination including a servo-motor for adjusting the pitch of the propeller blades to regulate the speed of the turbine driving the propeller, a source of fluid pressure for operating said servo-motor, a solenoid actuated valve controlling the application of fluid pressure to said servo-motor, electronic means associated with said solenoid valve, said electronic means operating within a predetermined range to detect differences between the turbine speed and a predetermined reference speed, and operating in response to such differences to energize the solenoid valve to vary the pitch of the blades to adjust the turbine speed to equal the reference speed, an underspeed governor operatively connected to said source and to said servo-motor and operating at a fixed predetermined engine speed to prevent dangerous underspeed when the turbine is operating below the control range of said electronic means, and means preventing operation of said underspeed governor as an overspeed governor.

13. In propeller assemblies driven by a turbine, the combination including a servo-motor for adjusting the pitch of the propeller blades to regulate the speed of the turbine driving the propeller, a source of fluid pressure for operating said servomotor, a solenoid actuated valve controlling the application of fluid pressure to said servomotor, electronic means associated with said solenoid valve, said electronic means operating within a predetermined range to detect differences between the turbine speed and a predetermined reference speed, and operating in response to such differences to energize the solenoid valve to vary the pitch of the blades to adjust the turbine to equal the reference speed, an overspeed governor operatively connected to said source and said servomotor and operating at a fixed predetermined turbine speed to prevent dangerous overspeed when the turbine is operating above the control range of said electronic means, means preventing operation of said overspeed governor as an underspeed governor, an underspeed governor operatively connected to said source and said servo-motor and operating at a fixed predetermined turbine speed to prevent dangerous underspeed when the turbine is operating below the control range of said electronic means, and means preventing operation of said underspeed governor as an overspeed governor.

14. In propeller assemblies driven by a turbine, the combination including a servo-motor for adjusting the pitch of the propeller blades to regulate the speed of the turbine driving the propeller, a source of fluid pressure for operating said servo-motor, a solenoid actuated valve controlling the application of fluid pressure to said servomotor, electronic means associated with said solenoid valve, said electronic means operating within a predetermined range to detect difference between the turbine speed and a predetermined reference speed, and operating in response to such differences to energize the solenoid valve to vary the pitch of the blades to adjust the turbine to equal the reference speed, an overspeed governor operatively connected to said source and said servo-motor and operating at a fixed predetermined turbine speed to prevent dangerous overspeed when the turbine is operating above the control range of said electronic means, means preventing operation of said overspeed governor as an underspeed governor, an underspeed governor operating at a fixed predetermined engine speed to prevent dangerous underspeed when the turbine is operating below the control range of said electronic means, means preventing operation of said underspeed governor as an overspeed governor, and means for cutting out effective operation of the electronic means and of the overspeed and underspeed governors and for manually controlling the adjustment of said blades to provide for feathering and negative pitch thereof.

15. In propeller assemblies driven by a turbine, the combination including a servo-motor for adjusting the pitch of the propeller blades to regulate the speed of the turbine driving the propeller, a source of fluid pressure for operating said servo-motor, a solenoid actuated valve controlling the application of fluid pressure to said servomotor, electronic means associated with said solenoid valve, said electronic means operating within a predetermined range to detect difference between the turbine speed and a predetermined reference speed, and operating in response to such differences to energize the solenoid valve to vary the pitch of the blades to adjust the turbine to equal the reference speed, an overspeed governor operatively connected with said source and said servo-motor and operating at a fixed predetermined turbine speed to prevent dangerous overspeed when the turbine is operating above the control range of said electronic means, feedback actuated means operatively interconnecting said propeller blades and said overspeed governor and means preventing operation of said overspeed governor as an underspeed governor, said overspeed governor being operable by said feedback actuated means to prevent blade angle of less than approximately $+10°$ even though said solenoid valve tends to decrease the pitch.

16. Propeller control means for a turbine driven propeller having pitch shiftable blades and reversible servomotors for shifting the blades, the combination comprising, a fluid regulator carried by the propeller and having fluid connection with the servo-motors, an adapter assembly with respect to which the regulator rotates and cooperates therewith to provide a reservoir, a source of fluid pressure developed by the relative rotation of the regulator and adapter assembly, mechanical means including a part of the adapter assembly for adjusting the regulator for propeller operation in the regimes of constant speed, negative thrust feathering and blade angle control, a regulator borne governing system defining the high speed limit and the low speed limit of the constant speed regime, a blade angle control valve connected with the source of fluid pressure means operable to select a speed setting within the limits defined by the regulator borne governing system for constant speed propeller operation, means including said blade angle control valve and operable under control of the mechanical means to render inoperative the regulator borne governing system when the regulator is adjusted for a regime of propeller operation other than constant speed, an electric driven feathering pump selectively operable to supplement said source of fluid pressure, a set of slip rings carried by the adapter assembly, a cooperating set of brushes for the slip rings, a finite governor means having an electric output through the slip-rings and brushes, valve means in the regulator borne governor system and responding to the electrical output of the finite governor for controlling the application of pressure fluid to the servo-motors for control of the propeller in the regime of constant speed operation, an electrical source of current connectible through the same slip-rings and brushes for energizing the electric driven feathering motor, propeller borne means responding to propeller speed for selecting the propeller borne device that will be energized through said slip-rings and brushes, propeller borne icing control means for the blades thereof, an independent source of electric current for the icing control means, and means for conducting the independent source of current to the icing control means including a slip-ring and brush common to the output of the finite governor and to the electric source for the feathering pump.

17. The combination set forth in claim 16 wherein the regulator has a cover, and recesses in the cover substantially enclose the brushes cooperating with the slip-rings, and said icing control means includes blade heating elements, and connector assemblies disposed radially outward of the brushes providing electrical connection to the blade heating elements.

18. Propeller control means for a turbine driven propeller having pitch shiftable blades and reversible servomotors for shifting the blades, the combination comprising, a fluid regulator carried by the propeller and having fluid connection with the servo-motors, for controlling propeller operation in the regimes of constant speed, negative thrust, feathering and blade angle control, cooperable brushes and slip-rings associated with the propeller, a finite governor acting through said slip-rings and brushes to control said regulator for propeller operation in the constant speed regime, an electrically operated feathering pump motor in the regulator and a source of current acting through said slip-rings and brushes for controlling the energization of the feathering pump, electrically operated icing control means on said propeller and a source of current acting through said slip-rings and brushes for energizing the icing control means, and means whereby one of said cooperable slip-rings and brushes is common to the simultaneous energization of either the finite governor and the icing means or the feathering pump and the icing means, and means whereby a plurality of said cooperable slip-rings and brushes are common to the alternate energization of the finite governor and the feathering pump.

19. In an aircraft propeller having pitch shiftable blades and reversible servo motors for shifting the blades, the combination comprising, a source of fluid pressure in the propeller, a blade angle distributor valve in the propeller for controlling the flow of fluid under pressure to the servo motors for shifting the blade pitch, a propeller borne governor for controlling the flow of fluid under pressure to the servo motors for marking the maximum and minimum limits of constant speed propeller operation, a fine control valve connected to the fluid pressure source for controlling the flow of relatively small amounts of fluid under pressure to the servo motors during constant speed operation, means outside of the propeller for selecting a reference speed to which the propeller is to be controlled, an additional governor responding to errors in speed between the reference speed and the propeller speed for controlling the operation of said fine control valve within said limits, outside control means for said propeller operable upon the blade angle distributor valve to select propeller operation either in a constant speed regime or in the feathering regime, solenoid means operable upon the fine control valve during propeller operation in the constant speed regime, electrical conductor means for applying the additional governor intelligence to the solenoid means, an electrically operated feathering pump in the propeller and adapted to supplement the said source of fluid pressure, and means responding to a predetermined speed of propeller operation when the outside control means calls for operation in the feathering regime, for disconnecting the additional governor from the solenoid means and for energizing the feathering pump.

20. In an aircraft propeller having pitch shiftable blades and reversible servo motors for shifting the blades, the combination comprising, a source of fluid pressure in the propeller, a blade angle distributor valve in the propeller for controlling the flow of the fluid under pressure to the servo motors for shifting the blade pitch, a propeller borne governor controlling the distribution of fluid pressure to the servo motors for marking the maximum and minimum limits of constant speed propeller operation, a fine control valve connected to the fluid pressure source for controlling the flow of relatively small amounts of fluid under pressure to the servo motors during constant speed operation, means outside of the propeller for selecting a reference speed to which the propeller is to be controlled, an additional governor responding to errors in speed between the reference speed and the propeller speed for controlling the operation of said fine control valve between said limits, outside control means for said propeller operable upon the blade angle distributor valve to select propeller operation either at a constant speed regime or in the feathering regime, solenoid means operable upon the fine control valve and actuated by said additional governor during propeller operation in the constant speed regime for controlling propeller operation to the selected reference speed, and means dependent upon the coaction of said blade angle distributor valve and said outside control means preventing propeller operation in the feathering regime when the outside control means calls for operation in the constant speed regime.

21. In an aircraft propeller having pitch shiftable blades and reversible servo motors for shifting the blades thereof, a source of fluid pressure generated in the propeller, control valve means in the propeller controlling the distribution of fluid pressure to either side of the servomotors for propeller operation at regimes of constant speed, negative thrust and feathering, an adapter assembly with respect to which the propeller rotates, means in the adapter assembly for adjusting the control valve means, an electrically driven feather pump in the propeller having an output into the source of fluid pressure, an electrical slip ring assembly carried by the adapter assembly, electrical brushes carried by the propeller and engageable with the slip ring assembly, speed governing means operatively associated with said control valve means and having an electrical input thru the slip ring assembly and brushes for controlling the propeller to a selected R. P. M. in the constant speed regime, a source of current and control means having an input thru said slip ring assembly and brushes for energizing the feathering pump, and relatively movable mechanical means for adjusting the control valve means for selecting an R. P. M. in the regime of constant speed at which the propeller is to operate and for selecting a regime of operation other than constant speed.

22. In propeller control means for a turbine driven propeller having pitch shiftable blades and reversible servomotors for shifting the blades, the combination comprising, a fluid regulator carried by the propeller and having fluid connection with the servo motor, an adapter assembly with respect to which the regulator rotates and cooperates to provide a reservoir, a source of fluid pressure developed by the relative rotation of the regulator and adapter assembly, mechanical means including a part of the adapter assembly for adjusting the regulator for propeller operation in the regimes of constant speed, negative thrust, feathering, minimum torque and blade angle control, a regulator borne governing system defining the high speed limit and the low speed limit of the constant speed regime, a blade angle control means connected with the source of fluid pressure and operable to select a regime other than constant speed propeller operation, means including said blade angle control means and operable under control of the mechanical means to render inoperative the regulator borne governing system when the regulator is adjusted for a regime of propeller operation other than constant speed, an electric driven feathering pump in the reservoir and selectively operable to supplement said source of fluid pressure, a set of slip rings carried by the adapter assembly, a cooperating set of brushes carried by the regulator each for engagement with a slip ring, a finite governing means having an electrical output to the regulator thru the slip rings and brushes, valve means in the regulator borne governing system and responding to the electrical output of the finite governor for controlling the application of pressure fluid to the servo-motors to control the propeller in the regime of constant speed operation, an electric source of current connectible through the same slip rings and brushes for energizing the electric driven feathering motor, and propeller borne means responding to propeller speed for selecting the propeller borne device that will be energized thru said slip rings and brushes.

23. In propeller control means for a turbine driven propeller having pitch shiftable blades and reversible servomotors for shifting the blades, the combination comprising, a fluid regulator carried by the propeller and having fluid connection with the servo motors, an adapter assembly with respect to which the regulator rotates and cooperates to provide a reservoir, a source of fluid pressure developed by the relative rotation of the regulator and adapter assembly, mechanical means including a part of the adapter assembly for adjusting the regulator for propeller operation in the regimes of constant speed, negative thrust, feathering, minimum torque and blade angle control, a regulator borne governing system defining the high speed limit and the low speed limit of the constant speed regime, a blade angle control means connected with the source of fluid pressure and operable to select a regime other than constant speed propeller operation, means including said blade angle control means and operable under control of the mechanical means to render inoperative the regulator borne governing system when the regulator is adjusted for a regime of propeller operation other than constant speed, a finite governing means having an electrical output to the regulator, and valve means in the regulator borne governing system and responding to the electrical output of the finite governor for controlling the application of pressure fluid to said servo-motors for controlling the propeller in the regime of constant speed operation.

24. In propeller control means for a turbine driven propeller having pitch shiftable blades and reversible servomotors for shifting the blades, the combination comprising, a fluid regulator carried by the propeller and having fluid connections with the servo motors, a source of fluid pressure developed by rotation of the regulator, mechanical means for adjusting the propeller for operation in the regimes of constant speed, negative thrust, minimum torque and blade angle control, a regulator borne governing system defining the high speed limit and the low speed limit of the constant speed regime, a blade angle control valve connected with the source of fluid pressure and operable to select a regime other than constant speed propeller operation, means including said blade angle control valve and operable under control of said mechanical means to render inoperative the regulator borne governing system when the regulator is adjusted for a regime of propeller operation other than constant speed, a finite governing means having an electrical output to the regulator, and valve means in the regulator borne governor system responding to the output of the finite governor for controlling the application of pressure fluid to the servo-motors for controlling the propeller at a selected R. P. M. in the regime of constant speed operation.

25. In propeller control means for a turbine driven propeller having pitch shiftable blades and reversible servo-motors for shifting the blades, the combination comprising, a fluid regulator carried by the propeller and having fluid connection for the servo motors for controlling propeller operation in the regimes of constant speed, negative thrust, minimum torque and blade angle control, cooperable brushes and slip rings associated with the propeller a finite governor acting thru said slip rings and brushes to control said regulator for propeller operation in the constant speed regime, an electrically operated feathering pump in the regulator, a source of current acting thru said slip rings and brushes for controlling the energization of the feathering pump, and means whereby a plurality of cooperable slip rings and brushes are common to the alternate energization by the finite governor and the electrically operated feathering pump.

26. Control apparatus for positioning pitch shiftable blades of a turbine driven propeller over a range of angles from feathering through constant speed to the maximum angle of negative thrust, comprising in combination, fluid pressure servo-motors for reversely shifting the blades, a source of fluid pressure for operating the servo-motors, passage means connecting the source with the servo-motors, and fluid pressure control elements inserted in the passage means for controlling the application of pressure fluid to the servo-motors for effecting propeller operation in any selected regime, said control elements including a constant speed governor valve, an under-speed governor valve and an over-speed governor valve marking the limits of a constant speed range of propeller operation, and blade-angle control means adapted when activated to override control by the governors and effect propeller operation in other than the constant speed regime, and manual means for activating the blade-angle control means when the propeller is to be operated in the negative thrust regime.

27. In an engine-propeller combination wherein the propeller has blades mounted for angular movement about their longitudinal axes to different pitch positions, the combination including a servo-motor operatively connected to said blades for adjusting the pitch position thereof to regulate the speed of the engine driving the propeller, a source of fluid pressure, means interconnecting said source of pressure and said servo-motor for controlling the application of pressure fluid to said servo-motor to change the pitch position of said blades to maintain the speed of said engine substantially constant, and means operatively connected with the blades so as to be positioned thereby during pitch changing movements thereof and with said means for adjusting the said means upon movement of said blades to a predetermined low pitch position to interrupt the application of pressure fluid to said servo-motor to further decrease the pitch position of said blades thereby preventing movement of said blades by said servo-motor to a pitch position in the negative thrust range when the engine speed is being maintained substantially constant.

28. In an aircraft propeller having blades mounted for angular movement about their longitudinal axes to different pitch positions and reversible servo-motors operatively connected to said blades for changing the pitch position thereof, the combination including, a source of fluid pressure, a blade angle distributor valve interconnecting said source and said motors for controlling the flow of pressure fluid to said servo-motors to effect movement of said blades to pitch positions outside of a governing range, a pair of valves connected to said source and to said servo-motors for controlling the flow of pressure fluid to the servo-motors, an over-speed governor operatively connected with one of said valves and an under-speed governor operatively connected with the other of said valves for establishing a high and a low speed limit of the governing range, a control valve connected to the source and to the servo-motors for controlling the flow of pressure fluid to said servo-motors in the governing range between said speed limits, a governor operatively associated with said control valve for controlling the actuation thereof, means associated with said governor for controlling the operation thereof to a speed between said high and low speed limits, and means operatively associated with said governor, said pair of valves and said blade angle control valve for blocking the connection between the blade angle control valve and the servo-motors in the governing range and for blocking the connection between said pair of valves and the servo-motors and inactivating the governor during propeller operation outside of the governing range.

29. Control apparatus for positioning pitch shiftable propeller blades of a turbine driven propeller adapted to be operated at either constant speed, feathering, negative thrust, minimum torque, or selected blade angle regime, comprising in combination, fluid pressure operated servo-motors operatively connected to said blades for adjusting the pitch thereof, and a fluid pressure system for actuating said servo-motors, said system including a source of fluid pressure, a plurality of conduits interconnecting the source and the servo-motors, and control valves connected with said conduits between the source and the servo-motors for controlling the application of pressure fluid to said servo-motors, said control valves including an electro-fluid valve for effecting propeller operation in a constant speed regime, an over-speed governor valve and an under-speed governor valve for establishing high and low speed limits of the constant speed regime, a blade angle control valve for effecting propeller operation in regimes other than constant speed, a selector valve for blocking the connection between said blade angle control valve and said servo-motors during propeller operation in the constant speed regime, and means including said selector valve for inactivating the electro-fluid valve, blocking the servo-motor connections of the over-speed and under-speed governor valves, and opening the connection between the servo-motors and the blade angle control valve during regimes of propeller operation other than constant speed.

30. The combination set forth in claim 29 wherein manually operable means are provided for adjusting said means including said selector valve and said blade angle control valve for effecting propeller operation in the negative thrust regime in lieu of operation in the constant speed regime.

31. The combination set forth in claim 29 wherein manually operable means are provided for adjusting said means including said selector valve and said blade angle control valve for effecting propeller operation in the feathering regime in lieu of operation in the constant speed regime, and wherein a second source of fluid pressure is rendered operative by said manually operable means when propeller operation in the feathering regime is selected.

32. The combination set forth in claim 29 wherein said selector valve is servo actuated and wherein manually operable means are provided for adjusting the blade angle control valve for effecting propeller operation in the minimum torque regime in lieu of operation in the constant speed regime.

33. The combination set forth in claim 29 wherein said selector valve is servo actuated, wherein a selector control valve controls the actuation of said selector valve and wherein manually operable means are provided for adjusting the selector control valve and the blade angle control valve for effecting propeller operation in the manually selected regime of blade angle in lieu of operation in the constant speed regime.

34. The combination set forth in claim 29 wherein a selector control valve is provided for controlling movement of said selector valve, and wherein manually operable means are provided for adjusting the selector control valve and the blade angle control valve for effecting propeller operation in the manually selected regime of blade angle and during transition from one regime to another regime.

35. Control apparatus for positioning pitch shiftable blades of a turbine driven propeller over a range of angles from feathering through constant speed to the maximum angle of negative thrust, comprising in combination, fluid pressure operated servo-motors operatively connected with said blades for adjusting the pitch thereof, a source of fluid pressure, passage means connecting the source with the servo-motors, and fluid pressure control elements inserted in the passage means for controlling the application of pressure fluid to the servo-motors, said control elements including a constant speed governor valve, an over-speed governor valve and an under-speed governor valve for establishing high and low speed limits of a constant speed range of propeller operation, and a blade angle control valve for effecting propeller operation in regimes other than constant speed, the connection between said blade angle control valve and said servo-motors being blocked during constant speed operation, means for eliminating control by said constant speed governor valve, blocking the servo-motor connections of the over-speed and under-speed governor valve, and opening the connection between the blade angle control valve and the servo-motors, and manually operable means for actuating said last recited means when the propeller is to be operated in a regime other than constant speed.

36. In an aircraft propeller having blades mounted for angular movement about their longitudinal axes to different pitch positions and a reversible servo-motor operatively connected to said blades for adjusting the pitch position thereof, the combination including, a source of fluid pressure, passage means interconnecting the source and the servo-motor, control means connected in said passage means for controlling the application of pressure fluid to said servo-motor, said control means including a constant speed governor valve having a speed setting, an over-speed governor valve and an under-speed governor valve, said over-speed governor valve being operable to control the application of pressure fluid cojointly with said constant speed governor valve upon a predetermined increase in propeller speed above the setting of said constant speed governor valve, said under-speed governor valve being operable to control the application of pressure fluid cojointly with said constant speed governor valve upon a predetermined decrease in propeller speed below the setting of said constant speed governor valve, and manually controlled means operable to eliminate control by said valves when propeller operation in a regime other than constant speed is selected.

37. In an aircraft propeller having blades mounted for angular movement about their longitudinal axes to different pitch positions and means operatively connected to said blades for adjusting the pitch position thereof, the combination including, governing means operatively associated with said pitch adjusting means for maintaining propeller speed substantially constant comprising a constant speed governor having a selected speed setting, an over-speed governor and an under-speed governor for establishing high and low speed limits of constant speed propeller operation, said over-speed governor being operable to control said pitch adjusting means cojointly with said constant speed governor upon a predetermined increase in propeller speed above the speed setting of said constant speed governor, said under-speed governor being operable to control said pitch adjusting means cojointly with said constant speed governor upon a predetermined decrease in propeller speed below the speed setting of said constant speed governor, and manually controlled means operable to eliminate control by said governing means when propeller operation other than constant speed is selected.

References Cited in the file of this patent

UNITED STATES PATENTS

| Re. 23,253 | Blanchard et al. | Aug. 15, 1950 |
| 1,374,787 | Walker | Apr. 12, 1921 |
| 2,363,670 | Hoover | Nov. 28, 1944 |
| 2,404,290 | Hoover | July 16, 1946 |
| 2,408,451 | Sorenson | Oct. 1, 1946 |
| 2,410,659 | Hoover | Nov. 5, 1946 |
| 2,474,144 | Forsyth | June 21, 1949 |
| 2,491,172 | Forsyth | Dec. 13, 1949 |
| 2,501,228 | Light | Mar. 21, 1950 |
| 2,502,041 | Geyer et al. | Mar. 28, 1950 |
| 2,576,619 | Martin | Nov. 27, 1951 |
| 2,612,958 | Richardson | Oct. 7, 1952 |

FOREIGN PATENTS

| 264,810 | Switzerland | Feb. 16, 1950 |